US012520132B2

United States Patent
Singh et al.

(10) Patent No.: US 12,520,132 B2
(45) Date of Patent: Jan. 6, 2026

(54) FULL PATH INTEGRITY CORRECTION IN A RECONFIGURABLE INTELLIGENT SURFACE BASED ON COMPROMISED PATH DETECTION

(71) Applicant: Dell Products L.P., Round Rock, TX (US)

(72) Inventors: Tejinder Singh, Manotick (CA); Navjot Kaur Khaira, Manotick (CA); Raja Neogi, Portland, OR (US)

(73) Assignee: DELL PRODUCTS L.P., Round Rock, TX (US)

( * ) Notice: Subject to any disclaimer, the term of this patent is extended or adjusted under 35 U.S.C. 154(b) by 52 days.

(21) Appl. No.: 18/656,449

(22) Filed: May 6, 2024

(65) Prior Publication Data

US 2025/0344058 A1 Nov. 6, 2025

(51) Int. Cl.
*H04W 12/033* (2021.01)
*H04W 12/102* (2021.01)

(52) U.S. Cl.
CPC ....... *H04W 12/033* (2021.01); *H04W 12/102* (2021.01)

(58) Field of Classification Search
CPC ............. H04W 12/033; H04W 12/102; H04W 56/0015; H04B 7/0617; H04J 13/0062
See application file for complete search history.

(56) References Cited

U.S. PATENT DOCUMENTS

| 12,413,932 B2 * | 9/2025 | Gummadi | G01S 5/0009 |
| 2015/0138992 A1 * | 5/2015 | Jover | H04K 3/224 |
| | | | 370/244 |
| 2021/0036753 A1 * | 2/2021 | Lee | H01Q 21/28 |
| 2023/0188170 A1 * | 6/2023 | Dutta | H04W 24/08 |
| | | | 375/346 |

(Continued)

OTHER PUBLICATIONS

Sun et al. "Enhancing Reconfigurable Intelligent Surface Security With Time of Flight Based Full Path Integrity Validation" U.S. Appl. No. 18/656,412, filed May 6, 2024, 45 pages.

(Continued)

*Primary Examiner* — Abu S Sholeman
(74) *Attorney, Agent, or Firm* — Amin, Turocy & Watson, LLP

(57) ABSTRACT

The technology described herein is directed towards monitoring and maintaining path integrity of a wireless communications path between authorized entities, in which a reconfigurable intelligent surface is part of the signal path between a base station and a user equipment. In one example, an eavesdropping entity intercepts signals to and/or from a base station and user equipment via a reconfigurable intelligent surface. The change in the path integrity from the redirected signals can be detected, e.g., via actual angle of arrival and/or signal strength data that does not match expected angle of arrival and/or expected signal strength; measured versus expected time-of-flight can be used to validate the path. The reconfigurable intelligent surface includes a reconfigurable delay detection network (Continued)

can change capacitance/phase to delay subsequently communicated signals and mitigate the attack. In one implementation, generative adversarial network models are used in the monitoring and correction of the signal path.

20 Claims, 26 Drawing Sheets

(56) References Cited

U.S. PATENT DOCUMENTS

2024/0046026 A1\* 2/2024 Lempel ............... H03M 7/3073

OTHER PUBLICATIONS

Sun et al. "Enhancing Reconfigurable Intelligent Surface Security With Angle of Arrival and Angle of Departure Based Full Path Integrity Validation" U.S. Appl. No. 18/656,396, filed May 6, 2024, 47 pages.

\* cited by examiner $d_n = \delta d + d_{n-1}$
(see FIG. 8)

FULL PATH INTEGRITY CORRECTION IN A RECONFIGURABLE INTELLIGENT SURFACE BASED ON COMPROMISED PATH DETECTION

BACKGROUND

Reconfigurable intelligent surfaces (alternatively referred to as intelligent reflective surfaces, or metasurfaces) are man-made thin reflective or refractive surfaces whose electromagnetic response can be electronically controlled. Reconfigurable intelligent surfaces are characterized by their two-dimensional arrays of electronically controllable reflecting elements that can dynamically manipulate electromagnetic waves by altering attributes such as phase, amplitude, and direction of the incoming signal.

Each metasurface typically is made up of (possibly up to) dozens, hundreds or thousands of unit-cells, and because the individual unit-cell can be controlled, reconfigurable intelligent surfaces can provide programmable and smart wireless environments. For example, one scenario is to use such a surface to intelligently reconfigure wireless communications. More particularly, objects in the path of a wireless signal, such as buildings and trees, can block wireless communication signals at higher frequencies, including millimeter-wave (mm-Wave) frequency bands (24.5 gigahertz, or GHz-52.6 GHz), and even higher. This can be overcome by installing a large number of base stations to provide coverage to otherwise blocked areas, but doing so would increase the infrastructure costs many times. Instead, a relatively inexpensive metasurface can be installed at various locations to reflect and/or refract higher frequency signals to otherwise blocked or weak coverage areas.

Physical security can be compromised in a mm-Wave communication system with reconfigurable intelligent surfaces. For example, an eavesdropper can introduce another reflector or metasurface, or can tap into signals, with respect to unauthorized receiving of the downlink beam to and/or uplink beam from a legitimate user equipment.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
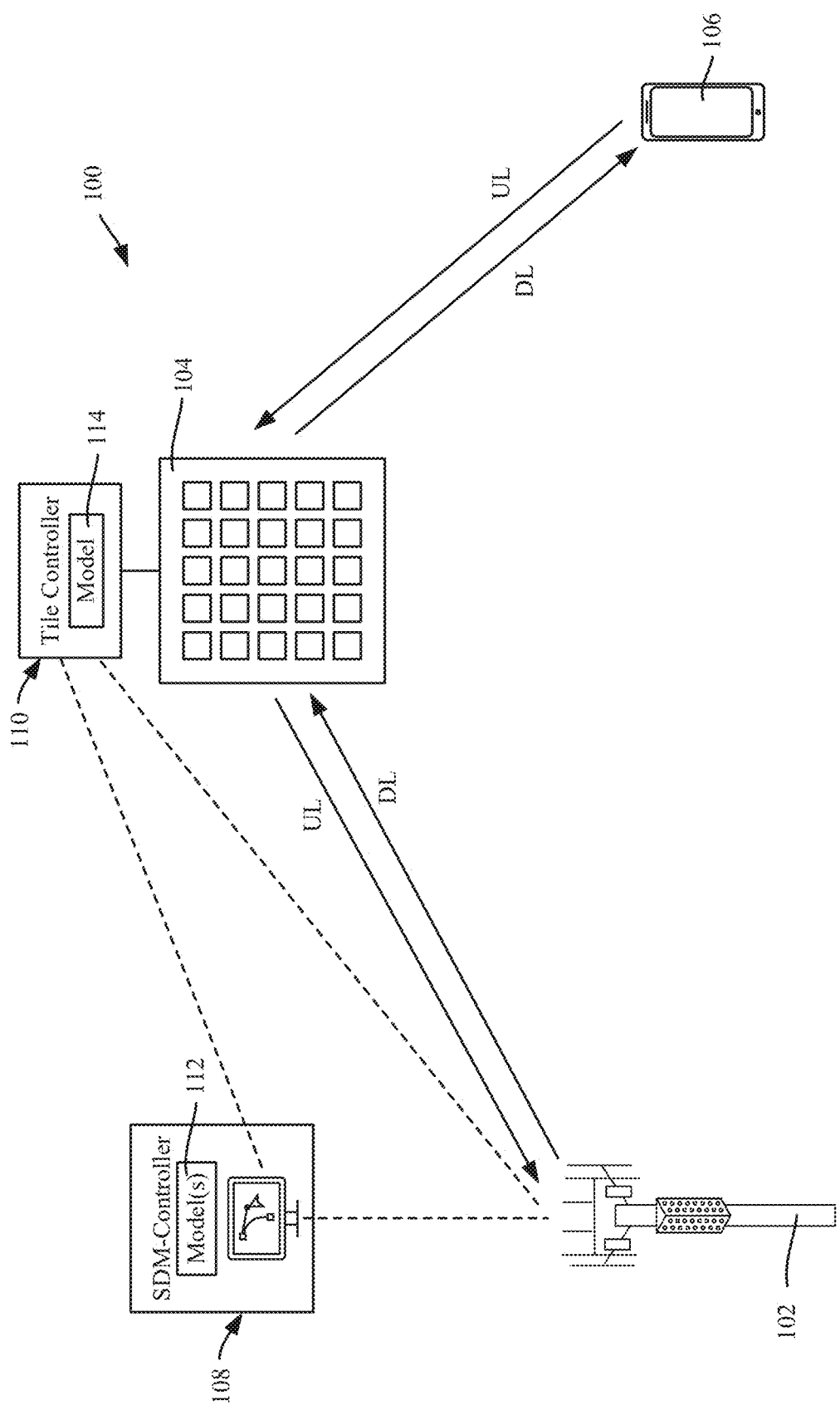
FIG. 1 is a representation of an example secure communication setup using a reconfigurable intelligent surface in a communications path, including models for verifying path integrity, in accordance with various example embodiments and implementations of the subject disclosure.

The technology described herein is generally directed towards changing delay times of communications with respect to a wireless communications path that includes a reconfigurable intelligent surface (also referred to as a tile), based on determining that the communications path may be compromised by an eavesdropper. The compromise can be detected by identifying any anomalies with respect to expected data. For example, an anomaly in the expected versus actual angle-or-arrival (AoA) for a given angle-of-departure (AoD) of a communication can be detected. This type of fingerprinting is facilitated by adding path-sensitive delay detection hardware (e.g., including multiple metal-insulator-metal capacitors) to a reconfigurable intelligent surface's hardware, as the detected delay/phase change relates to the actual angle of arrival. If a security risk is detected, e.g., the path is compromised, signal correction is performed, e.g., to add dynamic delay to communications after the detecting the security risk.

In one implementation, a receiving antenna is incorporated into or coupled to the reconfigurable intelligent surface, along with a delay detection network that monitors a signal for potential existence of the additional delay. An additional, unexpected delay can indicate a "change of path" attack in which an eavesdropping entity intercepts the source (e.g., base station-originated or user equipment-originated signal) and thereafter redirects the source signal to the intended receiver. By monitoring for such additional delay in the path, a notification of a potentially compromised signal path can be output (e.g., to the base station) for taking some mitigating action. The downlink angle of departure from the base station, via the reconfigurable intelligent surface, and the downlink angle of arrival at the user equipment can be parameters for part of the bidirectional path integrity evaluation. Similarly, the uplink angle of departure from the user equipment, and the uplink angle of arrival base station via the reconfigurable intelligent surface, can be bidirectional path integrity evaluation parameters.

In another type of "tapping into the signal path" attack, an eavesdropping entity listens in on the source (e.g., base station-originated or user equipment-originated) signal. This can be detected in part by evaluating the actual time of flight data versus previously measured time of flight data, which can be used to fingerprint the reconfigurable intelligent surface as the path identity and thereby verify the integrity of the communications path. With the "tapping into the signal path" attack, an anomaly in the expected versus actual amplitude received signal at the base station or a user equipment can be detected.

The amplitude, phase and resonance frequency of a signal received at the receiver of the reconfigurable intelligent surface can be parameters for part of the bidirectional path integrity evaluation, as can the received signal strength information, and the signal-plus-interference-to noise ratio data as detected by the user equipment (endpoint agent). Time of flight data can be used as parameters for path validation, e.g., to ensure that the path has not been altered as part of an attack. By monitoring for such a signal strength drop, a notification of a potentially compromised signal path can be output (e.g., to the base station) for taking the mitigating action changing of changing delay times of subsequent communications, e.g., intermittently in a random or pseudorandom pattern.

In one implementation, artificial intelligence/machine learning models can be used for automatic anomaly detection, e.g., by determining and evaluating the relative strengths of possible anomalies, e.g., for random samples in the path. Generative adversarial networks can be employed by an endpoint agent (e.g., at the user equipment) and at a tile controller coupled to the reconfigurable intelligent surface and the base station.

It should be understood that any of the examples and/or descriptions herein are non-limiting. Thus, any of the embodiments, example embodiments, concepts, structures, functionalities or examples described herein are non-limiting, and the technology may be used in various ways that provide benefits and advantages in communications and computing in general.

Reference throughout this specification to "one embodiment," "an embodiment," "one implementation," "an implementation," etc. means that a particular feature, structure, characteristic and/or attribute described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, characteristics and/or attributes may be combined in any suitable manner in one or more embodiments/implementations. Repetitive description of like elements employed in respective embodiments may be omitted for sake of brevity.

The detailed description is merely illustrative and is not intended to limit embodiments and/or application or uses of embodiments. Furthermore, there is no intention to be bound by any expressed or implied information presented in the preceding sections, or in the Detailed Description section. Further, it is to be understood that the present disclosure will be described in terms of a given illustrative architecture; however, other architectures, structures, materials and process features, and steps can be varied within the scope of the present disclosure.

It also should be noted that terms used herein, such as "optimize," "optimization," "optimal," "optimally" and the like only represent objectives to move towards a more optimal state, rather than necessarily obtaining ideal results. For example, "optimal" placement of a subnet means selecting a more optimal subnet over another option, rather than necessarily achieving an optimal result. Similarly, "maximize" means moving towards a maximal state (e.g., up to some processing capacity limit), not necessarily achieving such a state, and so on.

It will also be understood that when an element such as a layer, region or substrate is referred to as being "on" or "over" "atop" "above" "beneath" "below" and so forth with respect to another element, it can be directly on the other element or intervening elements can also be present. In contrast, only if and when an element is referred to as being "directly on" or "directly over" another element, are there no intervening element(s) present. Note that orientation is generally relative; e.g., "on" or "over" can be flipped, and if so, can be considered unchanged, even if technically appearing to be under or below/beneath when represented in a flipped orientation. It will also be understood that when an element is referred to as being "connected" or "coupled" to another element, it can be directly connected or coupled to the other element or intervening elements can be present. In contrast, only if and when an element is referred to as being "directly connected" or "directly coupled" to another element, are there no intervening element(s) present.

The following detailed description is merely illustrative and is not intended to limit embodiments and/or application or uses of embodiments. Furthermore, there is no intention to be bound by any expressed or implied information presented in the preceding sections, or in the Detailed Description section.

One or more example embodiments are now described with reference to the drawings, in which example components, graphs and/or operations are shown, and in which like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details, and that the subject disclosure may be embodied in many different forms and should not be construed as limited to the examples set forth herein.

FIG. 1 is a conceptual depiction of an example system 100 including a base station 102 that communicates downlink (DL) and uplink (UL) signal transmissions, via a reconfigurable intelligent surface 104, with a user equipment 106. Although not explicitly shown in FIG. 1, consider that the reconfigurable intelligent surface 104 is needed to avoid an obstacle between the base station 102 and the user equipment 106.

The base station 102 is coupled to a software defined metasurface (SDM) controller 108 that manages tile controllers, including a tile controller 110 coupled to the reconfigurable intelligent surface 104. Note that a tile controller may manage multiple reconfigurable intelligent surfaces, e.g., generally located close to one another, such as mounted on or deployed within a building or close group of buildings.

As will be understood, in one implementation, the defined metasurface controller 108 includes a group of artificial intelligence (AI/ML) models 112, and the tile controller 110 includes a model 114 (e.g., a generative adversarial network model), that work together to verify the integrity of the communications path between the base station 102 and the UE 106 via the reconfigurable intelligent surface 104. In one implementation, the group of AI/ML models 112 includes a deep reinforcement learning model, a large language model (LLM) and a generative adversarial network model.

Figure 2:
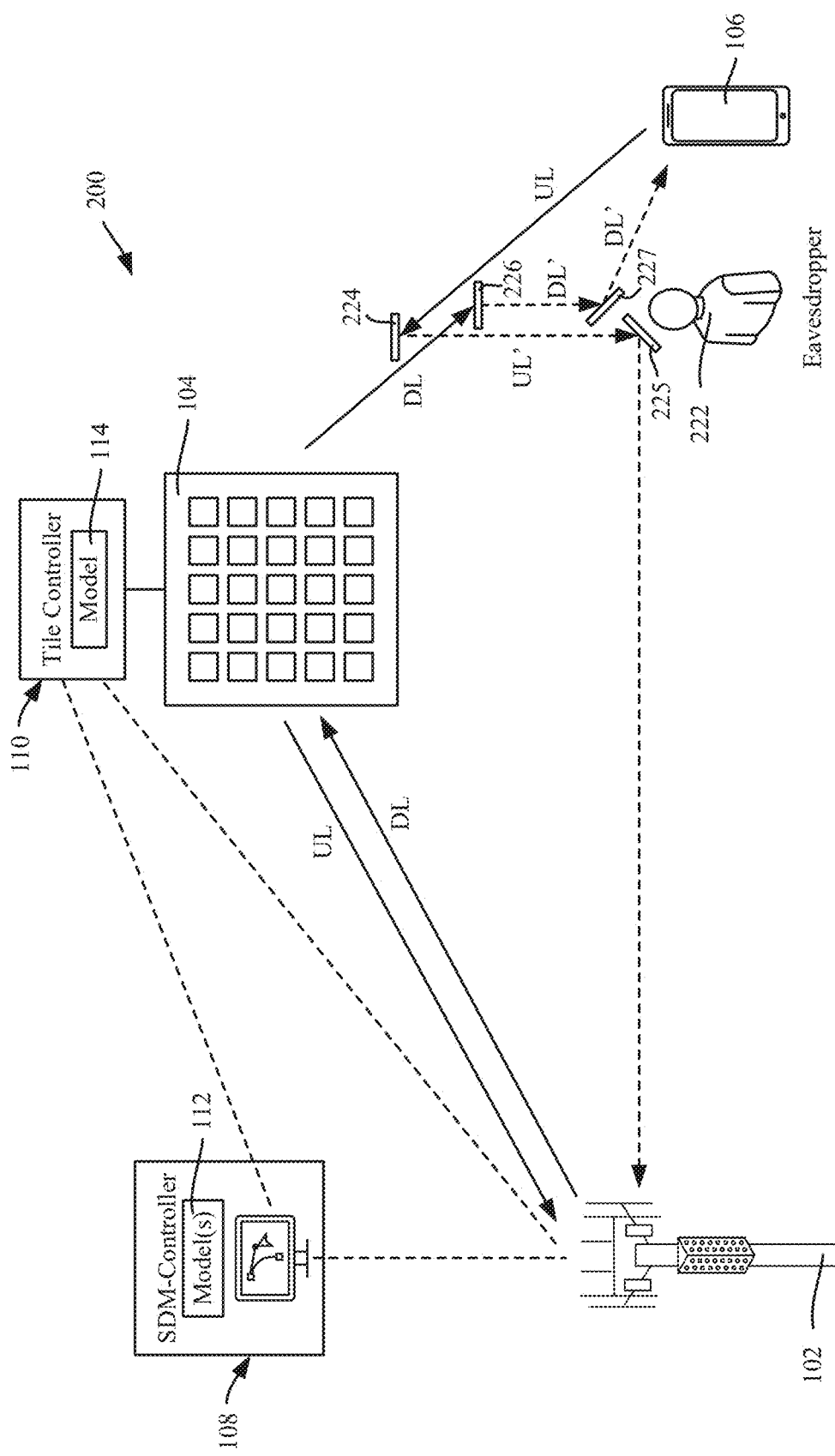
FIG. 2 is a representation of an example attacking scenario in which an eavesdropper intercepts and redirects uplink and/or downlink communications in a communications path involving a reconfigurable intelligent surface, in accordance with various example embodiments and implementations of the subject disclosure.

FIG. 2 is a conceptual depiction of a later instance 200 of the example system (i.e., system 100 of FIG. 1). In FIG. 2, an eavesdropping entity (eavesdropper) 222 has inserted one or more reflective elements (two example reflective elements 224 and 226 are shown) into the intended communications path to redirect the uplink UL and/or downlink DL communication signals as redirected signals UL' and DL'. Note that the eavesdropper 222 may hijack only the uplink or downlink signal, but in this example receives both.

In this attacking scenario, so that the communications continue, the eavesdropper 222 also redirects the uplink signal (also denoted UL') from the user equipment 106 back to the base station 102 via a reflective element 225, and/or redirects the downlink signal (also denoted DL') to the user equipment 106 via a reflective element 227. Although not explicitly shown, consider that the eavesdropper 222 can avoid any obstacles when sending back the UL' and DL' signals, possibly via another reconfigurable intelligent surface or other reflecting element(s).

When the eavesdropper changes the path of the uplink channel (UL) by introducing another reflector or metasurface as in FIG. 2, there is an additional delay added to the signal going from the user equipment to the base station, or from the base station to the user equipment, which also corresponds to a different uplink angle of arrival at the base station or downlink angle of arrival at the user equipment. The additional delay times are used to extract information about the authenticity of the signal; an advanced metasurface as described herein provides a layer of authentication to check the delayed signal at hardware level, offering a methodology of integrity validation over communication paths that use a reconfigurable intelligent surface for secure communication links.

Thus, described herein is detecting such an attack scenario, based on the base station not receiving the uplink communications via an expected uplink angle of arrival, and the user equipment not receiving the downlink communications via an expected downlink angle of arrival. To this end, the reconfigurable intelligent surface is coupled to a receive (Rx) antenna, (or multiple Rx antennas), and contains detection circuitry that detects changes from the expected path. In particular, the detection can be phase change detection, capacitance change detection, and/or differential delay detection; these are interrelated and map to an angle of arrival. For example, a received signal from one angle of arrival has different delay times experienced by the unit cells of the reconfigurable intelligent surface than when received from a different angle of arrival; these can be estimated through a change in resonance frequency of the overall capacitance, which also changes differential phase data, e.g., between adjacent unit cells.

Figure 3:
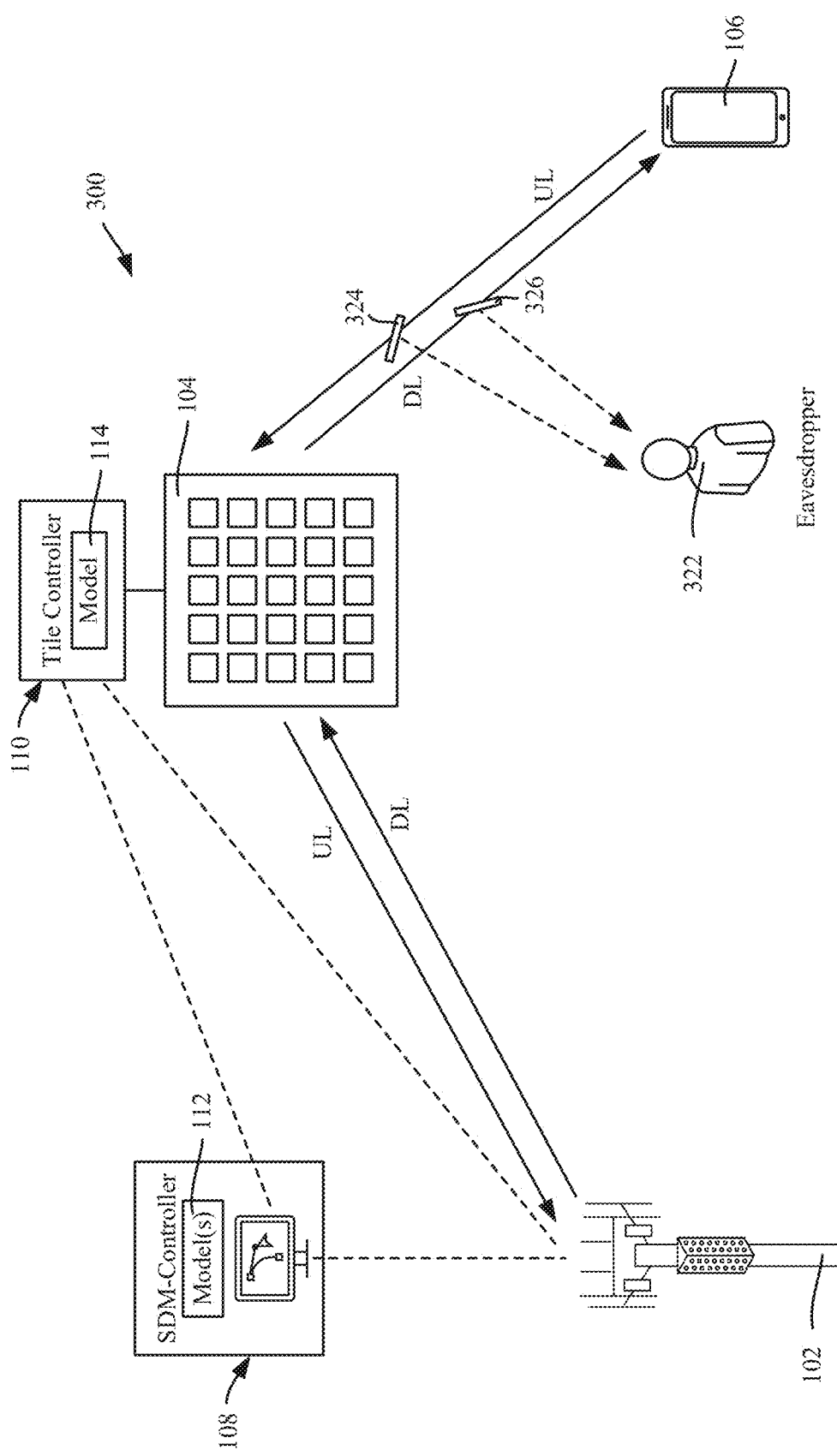
FIG. 3 is a representation of an example attacking scenario in which an eavesdropper taps into uplink and/or downlink communications in a communications path involving a reconfigurable intelligent surface, in accordance with various example embodiments and implementations of the subject disclosure.

FIG. 3 is a conceptual depiction of another later instance 300 of the example system (i.e., system 100 of FIG. 1). In FIG. 3, an eavesdropping entity (eavesdropper) 322 has inserted one or more reflective elements (two example reflective elements 324 and 326 are shown) into the intended communications path to tap into the uplink (UL) and/or downlink (DL) communication signals. Note that the eavesdropper 322 may tap into only the uplink or downlink signal, but in this example receives both. Further note that as with FIG. 2, the eavesdropper may not be a person, but can be a recording device, a device configured to detect certain data (e.g., words or phrases), and so on.

In this attacking scenario, the eavesdropper 322 couples a small portion of the energy from the original communication link by introducing another reflector or metasurface. Because some of the energy is coupled, this corresponds to a drop in amplitude in the signal received by the user equipment from the base station, that is, changes the beam fingerprint. This also can result in a time of flight change with respect to an expected time of flight from the sender to the receiver via the reconfigurable intelligent surface.

The received amplitude can be used to extract information about the authenticity of the signal; an advanced metasurface as described herein provides a layer of authentication to check the beam fingerprint at hardware level, offering a methodology of integrity validation over communication paths that use a reconfigurable intelligent surface for secure communication links. Further, the expected time of flight can be learned as a path fingerprint for the reconfigurable intelligent surface, validating that the path has not been altered.

Thus, described herein is detecting such an attack scenario, based on the base station or user equipment not receiving the expected signal strength over a validated path, and/or because the path integrity cannot be validated. To this end, the reconfigurable intelligent surface is coupled to a receive (Rx) antenna, (or multiple Rx antennas), and contains detection circuitry in the form of a reconfigurable delay detection network that detects any $S_{11}$ and/or $S_{21}$ amplitude changes from the expected beam fingerprint over the time-of-flight validated path/reconfigurable intelligent surface. The reconfigurable delay detection network can be tuned with respect to selecting a delay that changes the frequency shift, leading to the detection of security risks, e.g., and eavesdropper in the path.

In general, a reconfigurable intelligent surface is typically made from adaptable two-dimensional element arrays, also referred to as an array of unit cells, with each element/unit cell being able to toggle between multiple reflection phases. The precision of the reflected field patterns depends on the size of the aperture and the count of reflective elements, which can be suited to varying communication contexts and settings.

Figure 4A:
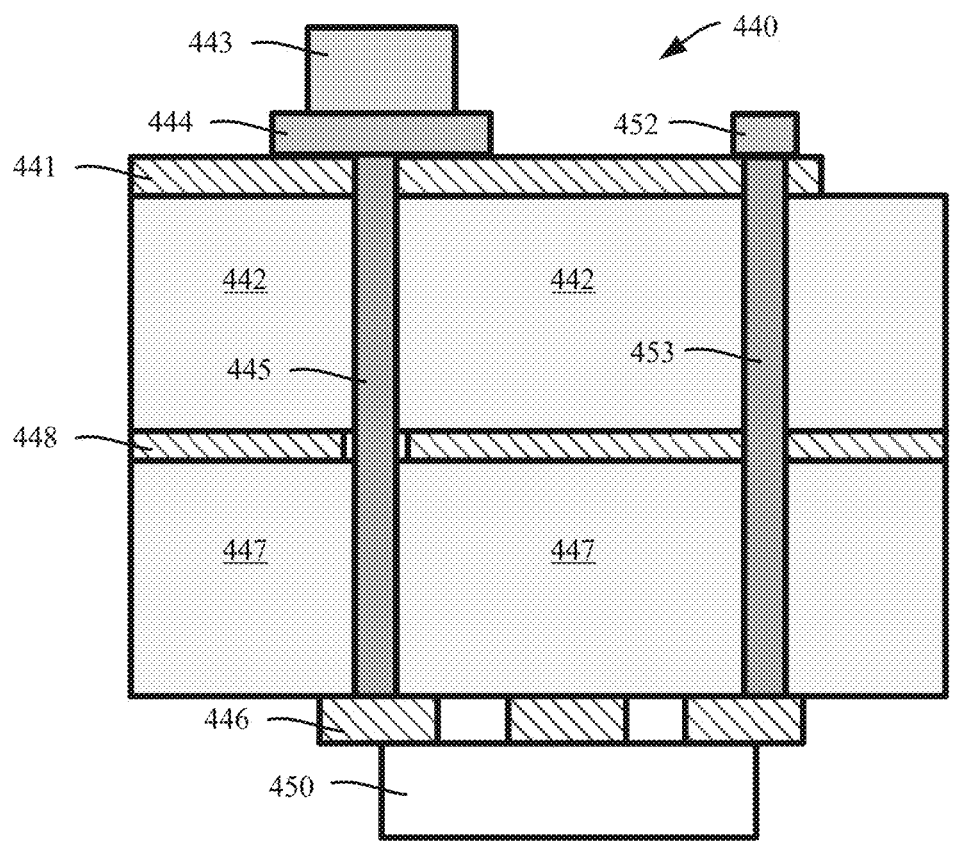
FIG. 4A is a cross-sectional side view of an example unit cell design showing a stack and arrangement of fabricated layers of a unit cell of a reconfigurable intelligent surface, in accordance with various example embodiments and implementations of the subject disclosure.

FIG. 4A shows a cross-sectional side view of a nonlimiting fabrication layer stack and arrangement of a unit cell 440. A top metallization layer 441 is patterned on a first substrate layer 442. The unit cells/elements are designed on each cell's metallization layer 441. In one example implementation, a surface mounted device (SMD) tunable device 443 (e.g., varactor/capacitor PIN diode) can be soldered on top of SMD pads 444 atop the metallization layer 441, with a via 445 (e.g., for voltage control connections of the tunable device 443) to a bottom metallization layer 446 (and control pads) that couples to a microcontroller that determines the voltage to the tunable device 443.

The underside of the first substrate layer 442 is separated from a second substrate layer 447 by a metal plane 448 acting as RF ground. Below the underside of the second substrate layer 447 is the bottom metallization layer 446 which is patterned to form the DC biasing and control circuitry. To ensure seamless interconnection across the multi-layered stack, the via 445 is strategically positioned. For instance, the tunable device 443 (e.g., varactor) is linked to two vias (only one via 445 is represented in the example of FIG. 4A; another via, not explicitly shown, connects the varactor's negative terminal to the ground plane 448, while the other via 445 links its positive terminal to the biasing on the bottom metal layer 446.

Also shown in FIG. 4A is a delay detection network 450 as described herein, which in general operates to determine a delay value for the unit cell 440, which has a relationship with the angle of arrival of a signal. As described herein, the delay values for a group of unit cells can be mapped to differential phases, which can be used to estimate the angle of arrival.

The delay detection network 450 is coupled to the signal received at a receive (Rx) antenna 452 through a via 453. Note that not every unit cell needs a receive antenna. For example, there can be one receive antenna per subgroup of unit cells, e.g., a 9×9 subarray module. Still further, only unit cells (e.g., a row or column of adjacent unit cells) that are used for detecting the delay/capacitance change need to be coupled to a delay detection network, which in turn is coupled to a receive antenna.

Figure 4B:
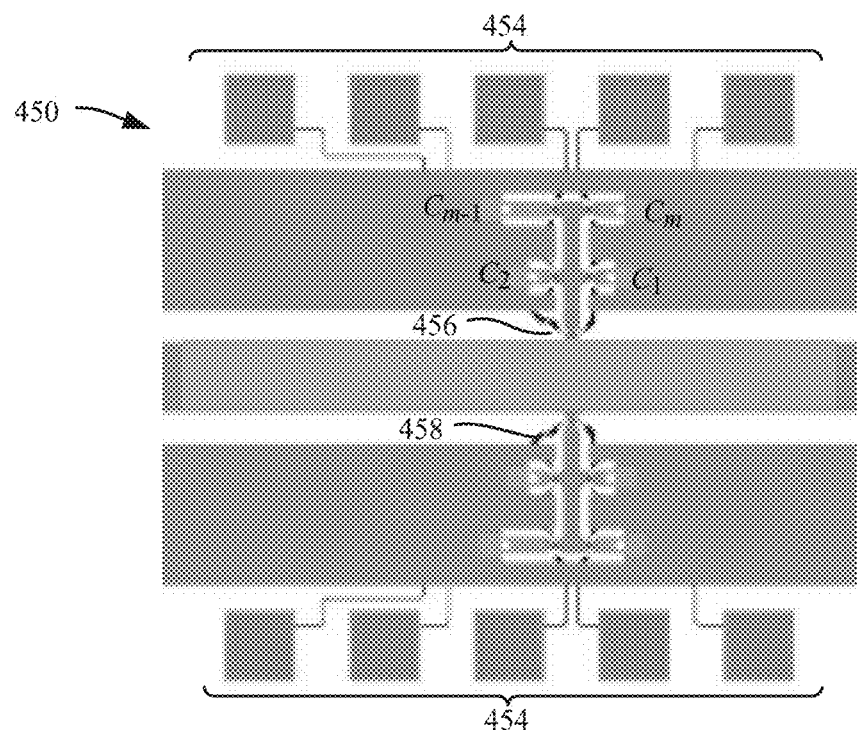
FIG. 4B is a representation of an example portion of a reconfigurable delay detection network that can be coupled to a reconfigurable intelligent surface's cells, by which communications path changes can be detected, in accordance with various example embodiments and implementations of the subject disclosure.

FIG. 4B shows a portion of one nonlimiting example implementation of delay detection network circuitry 450. In FIG. 4B, control pads 454 couple the RF signal to capacitors, e.g., capacitors $C_1$-$C_m$, which facilitate reading the change in capacitance to investigate the delay of an RF signal received (via the Rx antenna 341) at the corresponding unit cell. Loading switches 456 and 458 can be controlled to change the total capacitance, corresponding to different tuning states, e.g., by coupling different numbers and/or capacitors having different capacitance values together in various combinations.

Figure 5A:
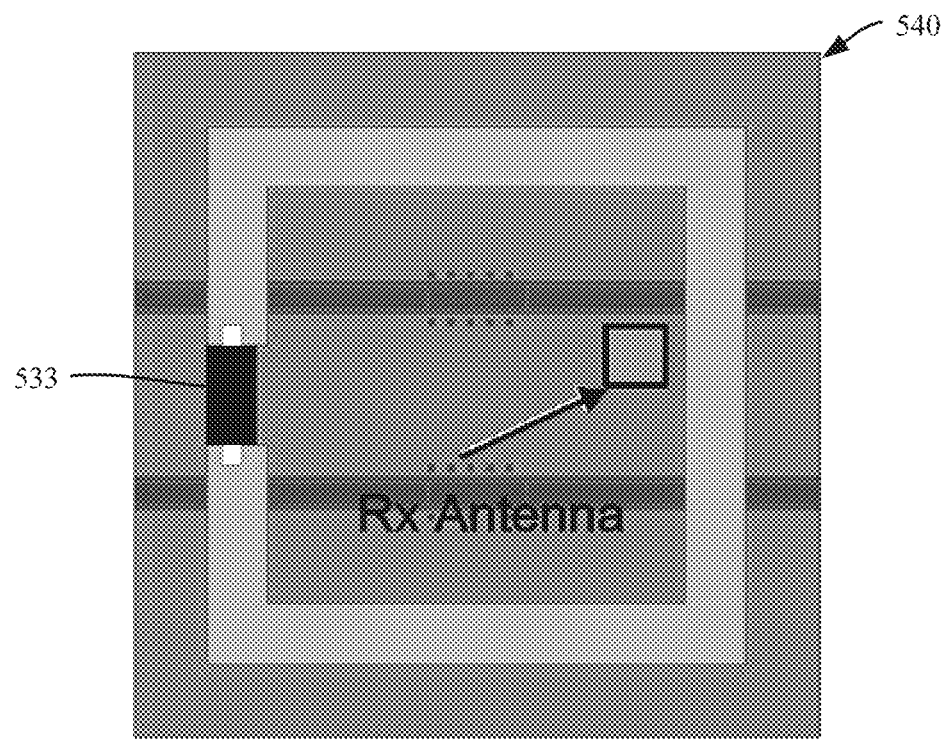
FIG. 5A is a semi-transparent top view representation of an example unit cell having a receive (Rx) antenna and a variable tuning element, in accordance with various example embodiments and implementations of the subject disclosure.
Figure 5B:
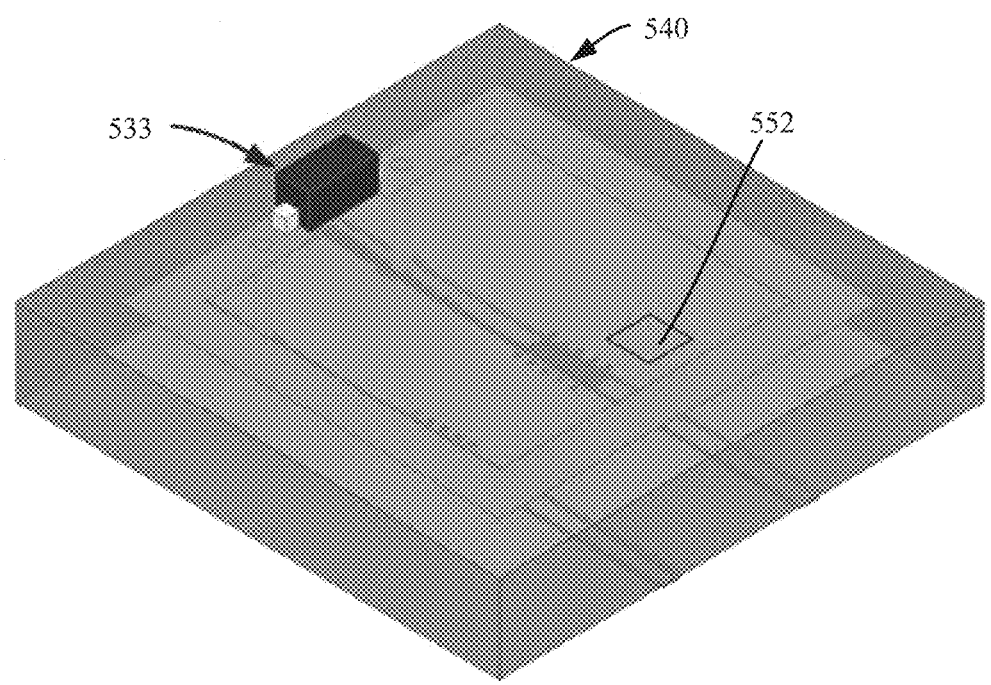
FIG. 5B is a semi-transparent perspective view representation of an example unit cell having a receive (Rx) antenna and a variable tuning element, in accordance with various example embodiments and implementations of the subject disclosure.

FIGS. 5A and 5B show a top view representation and a perspective view representation, respectively, of an example unit cell 540 having a receive (Rx) antenna 553 and a variable tuning element 533. As described with reference to FIG. 5A, the Rx antenna 552 is coupled to the delay detection network (FIG. 6), which can measure delay values corresponding to phases ($S_{21}$ signal)/capacitances/complex impedance which relate to the angle of arrival, which if different from what is expected (previously known to the base station/tile controller/centralized metasurface controller), can indicate that the signal path integrity is compromised.

Figure 6:
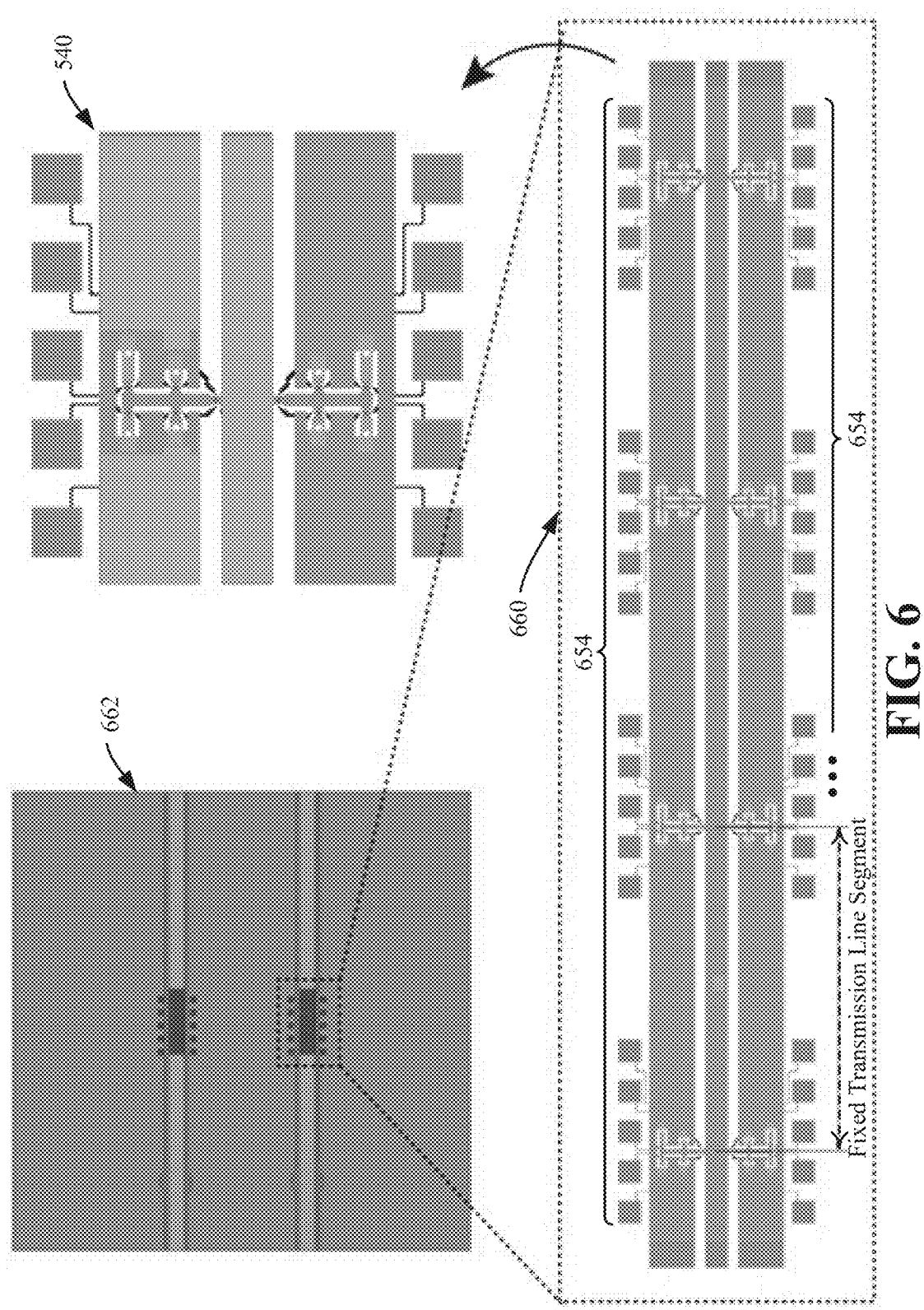
FIG. 6 is a representation of an example reconfigurable delay detection network, along with a bottom view representation of an example unit cell, and with an enlarged example portion of the delay detection network, in accordance with various example embodiments and implementations of the subject disclosure.

FIG. 6 is a representation of an example reconfigurable delay detection network 660, along with a bottom view representation 662 of an example unit cell and of an enlarged example portion 540 of the reconfigurable delay detection network. Any signal that is flowing (e.g., from left to right) in the RF control pads 544, is used to detect any capacitance change (due to an impedance mismatch) that is occurring, that is, the capacitance/complex impedance is different on the well-known Smith chart for the $S_{21}$ signal, which corresponds to detecting differential phase values.

Figure 7:
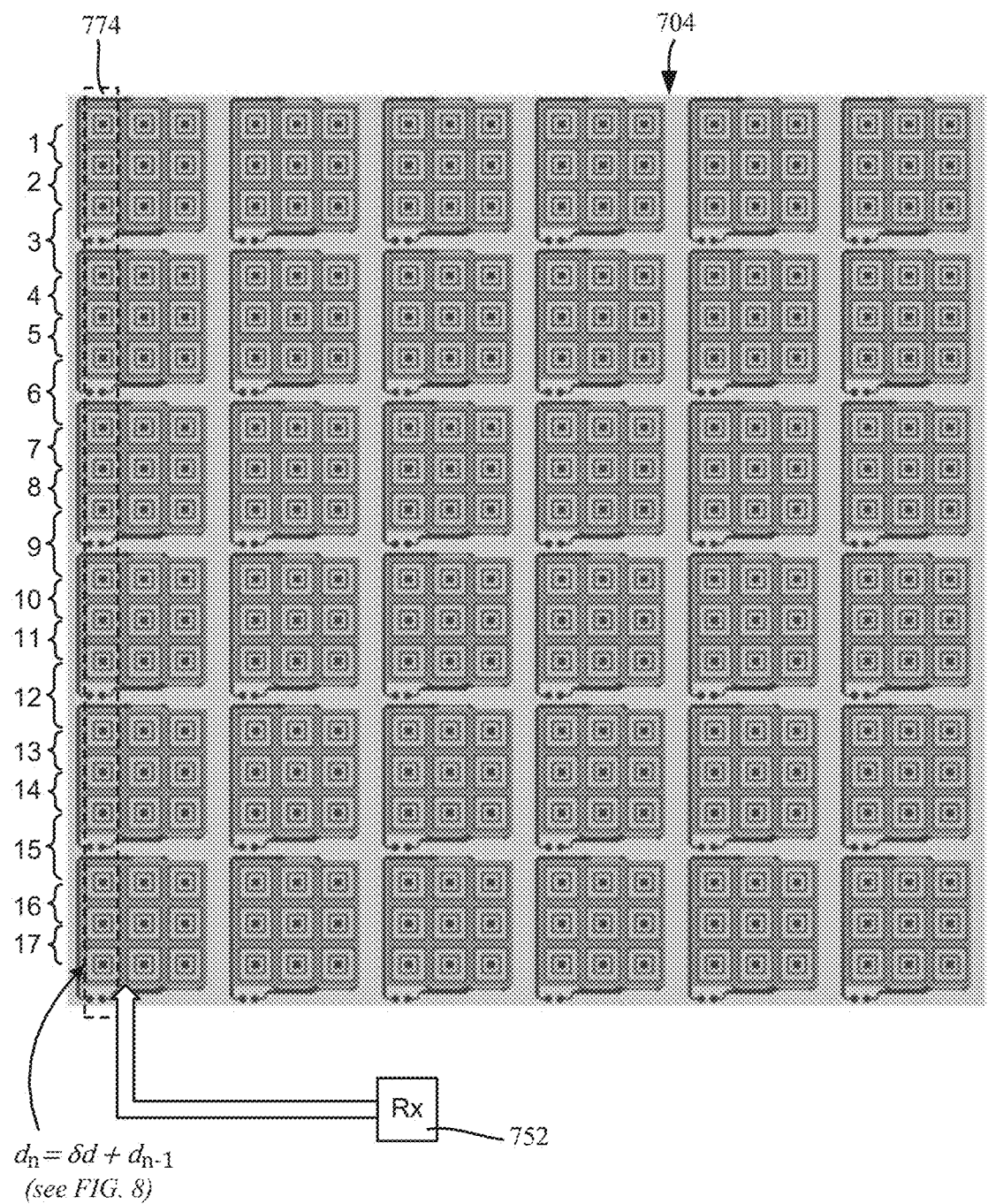
FIG. 7 is a reconfigurable intelligent surface of 6×6 panels using individual 3×3 modules of unit cells (total 18×18 unit-cell elements), coupled to a receive (Rx) antenna, and in which pairs of a selected column of adjacent unit cells experience different signal delays corresponding to an angle of arrival of a signal, in accordance with various example embodiments and implementations of the subject disclosure.

FIG. 7 shows a reconfigurable intelligent surface 704 in which the unit cells are arranged as 3×3 subarrays in modules, or subpanels in a 6×6 array, forming a total of 18×18 unit-cell elements. There is no requirement that unit cells be arranged as subarrays, or modules, however certain situations benefit from having such modules, e.g., a selected number of such modules can be interconnected as needed for a given scenario. As set forth herein, at least one receive Rx antenna 752 is associated with the reconfigurable intelligent surface 704 and coupled to corresponding delay detection network circuitry.

In one example implementation, these reconfigurable intelligent surfaces can be segmented into columns or rows of elements. Delay detection can occur within only one selected column or row, such as the leftmost column labeled 774 in FIG. 4.

Figure 8:
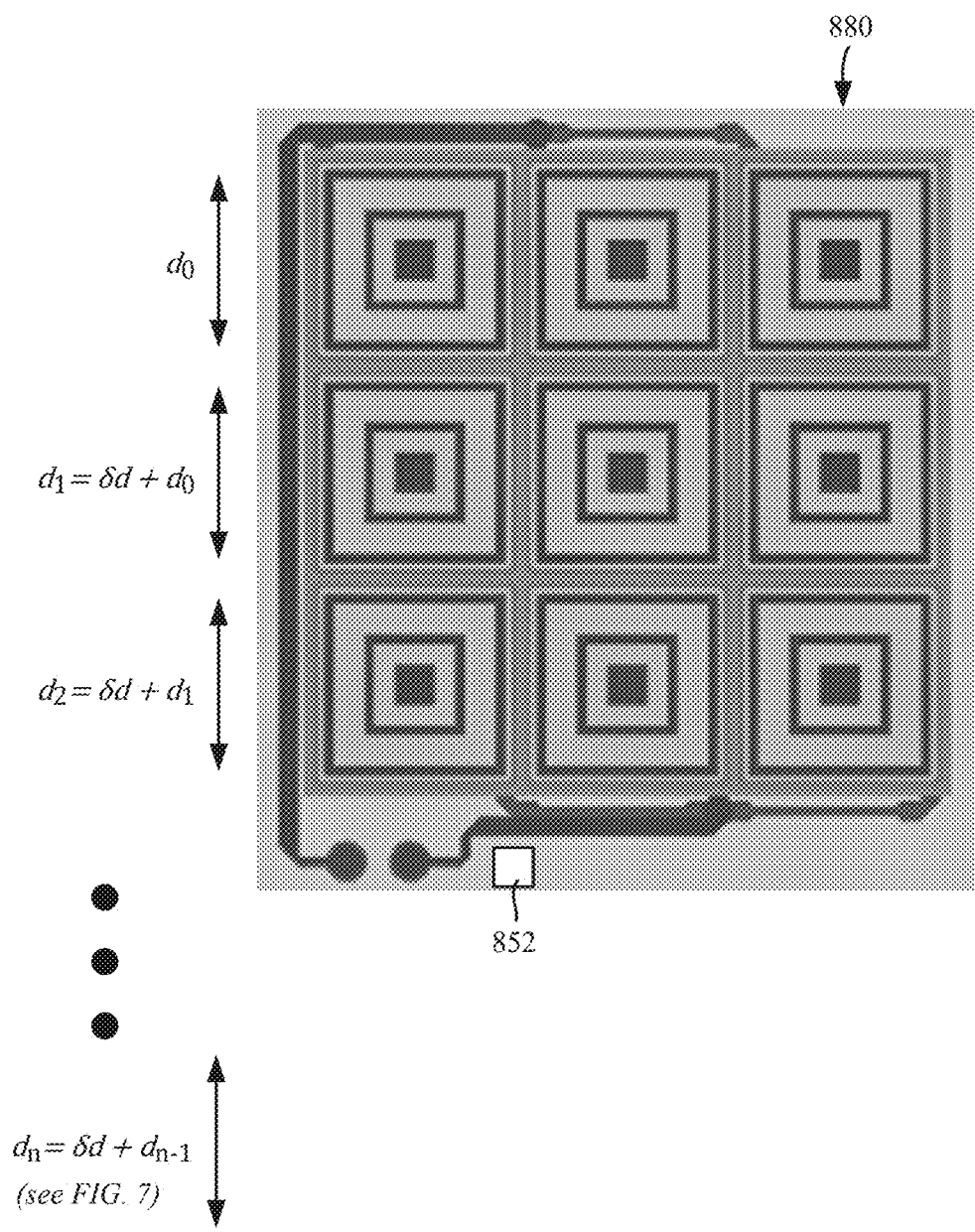
FIG. 8 is enlarged representation of an example 3×3 module of FIG. 6, incorporating a receive (Rx) antenna, showing different signal delays along vertically adjacent unit cells, in accordance with various example embodiments and implementations of the subject disclosure.

FIG. 8 shows the concept of delay detection, in which different delays are experienced at different cells of a subarray (module) 880 of the reconfigurable intelligent surface 704. A delay delta (δd) is added to each adjacent cell's delay in the same column, for example, and thus delay values range from $d_0$-$d_n$, increasing by δd for each adjacent cell downwards in this example. Note that a per-subarray receive antenna 852 is shown. Significantly, the differential delays correspond to the received signal's angle of arrival, which also corresponds to differential phases/capacitance values which determine the differential phases.

For example, for an uplink signal, the angle of arrival (AoA) is determined by using the differential delay between each element as shown in FIG. 8. The angle of departure (AoD) is controlled by the reconfigurable intelligent surface 704 (the tile controller coupled thereto). In other words, the differential delay between immediate/adjacent cells can be used to determine the angle of arrival.

To determine the differential delays, when the Rx antenna(s) at the reconfigurable intelligent surface receives the signal, the signal is processed through the bottom circuit layer where the reconfigurable delay detection network is connected. The reconfigurable delay detection network estimates the delay through a change in resonance frequency of the overall capacitance.

Thus, as described herein, among other information the received signal can be used to determine the angle of arrival of the incoming signal. This can be done by evaluating the phase differential values between at least some adjacent pairs of unit cells, represented in FIG. 7 by the column labels 1-17. For example, column (or row), the phase differential values between the fields sampled by the first and second substrate integrated waveguides is labeled as side-cell index '1', between the second and third substrate integrated waveguides of two adjacent unit cells is labeled as side-cell index '2', and so on.

Figure 9:
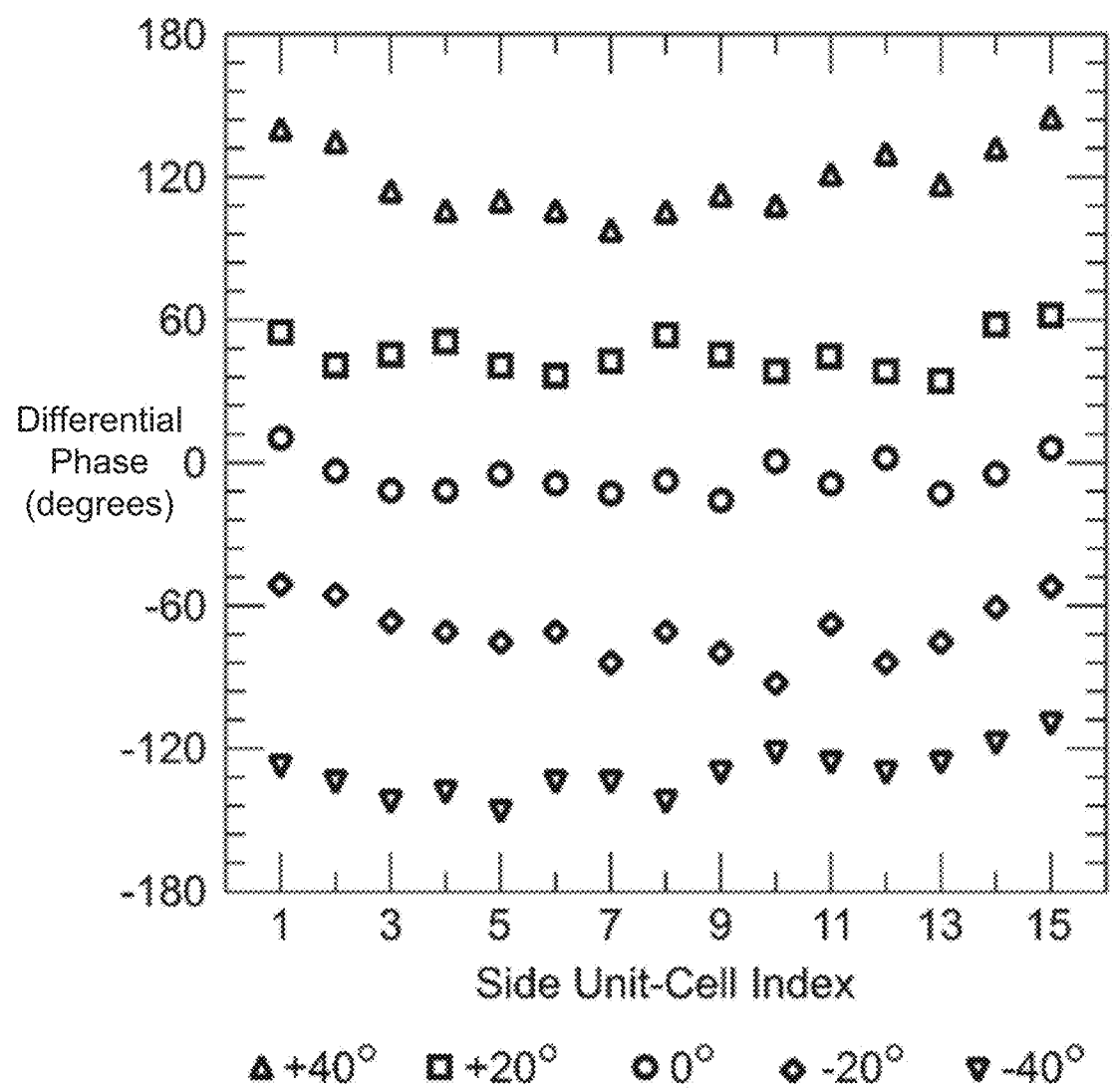
FIG. 9 is a graphical representation showing an example of differential phase values experienced by unit cells elements along a 16×1 array of elements of a reconfigurable intelligent surface, in accordance with various example embodiments and implementations of the subject disclosure.

FIG. 9 graphically shows the simulated differential phase along the reconfigurable intelligent surface array of 16×1 elements for the incoming wave at five different incident angles. More particularly, to illustrate how the technology described herein can deduce information about a reconfigurable intelligent surface's incoming signal/channel, a row of sixteen elements was selected resulting in fifteen adjacent cell pairs/side-cell indexes; (note that FIG. 9 depicts a selected column of eighteen elements having seventeen labeled pairs of side-cell indexes, however the principle is the same).

To obtain the results shown in FIG. 9, the phase differences were obtained between pairs of consecutive elements for incoming waves at different angles. For instance, as with FIG. 7, the measurement labeled '2' in FIG. 9 indicates the phase disparity between the second and third unit cells in the selected column. As can be seen in FIG. 9, the phase difference varies based on the incident angle of the incoming wave, and is relatively linear for a given angle; for example, an incoming angle of +20 degrees (the square pattern) generally aligns for the unit cell indexes along a 60 degree differential phase value. The phase differences for a row (or column) can be averaged or otherwise combined to map to a more particular angle of arrival estimate, and the phase differences for more than one row or column can be evaluated. Although only five angles of arrival are shown, other angles of arrival can be measured or simulated to obtain phase differential profiles that indicate what the angle of arrival is. Interpolation between the phase differences of two simulated or known for angles of arrival also can be used to estimate phase differences for angles of arrival between those two.

It should be noted that more valuable information can be obtained by using the differential delay values from more unit cells. However, if only a row or column of adjacent cells are used for evaluation, delay detection networks may not be needed for the non-evaluated unit cells. Still further, while the phase differences of adjacent cells were evaluated with respect to FIG. 7, information can be obtained from non-adjacent cells, e.g., phase differences between the first and third unit cells, the third and fifth unit cells and so on can be used to estimate an angle of arrival, although likely somewhat less accurately.

Figure 10:
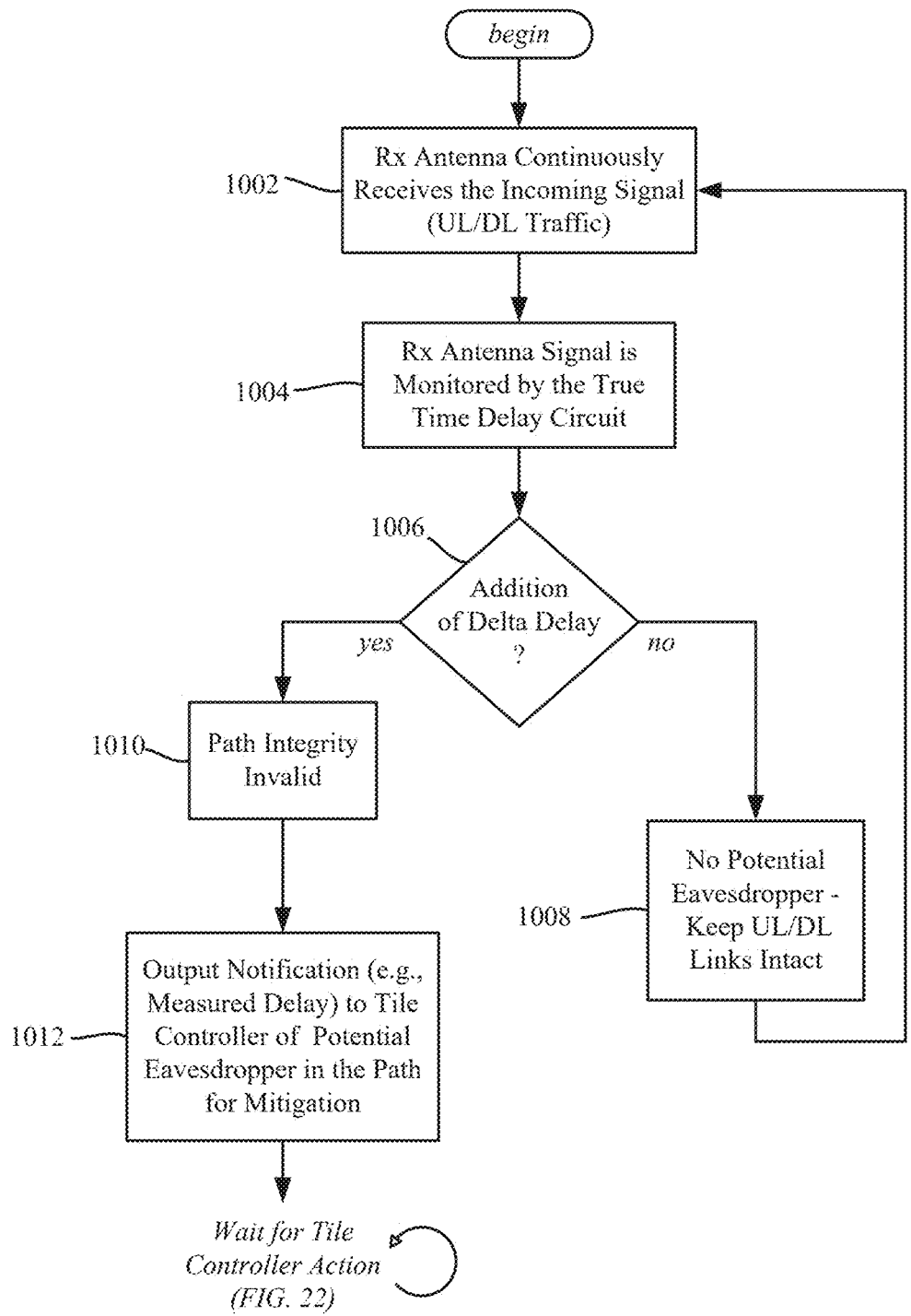
FIG. 10 is a flow diagram showing example operations related to monitoring the receive (Rx) antenna of a reconfigurable intelligent surface to verify path integrity, in accordance with various example embodiments and implementations of the subject disclosure.

FIG. 10 is a flow diagram showing example operations related to monitoring path integrity, beginning at operation 1002 which represents the Rx antenna continuously receiving the incoming signals for both uplink and downlink (UL/DL) traffic. Operation 1004 represents the incoming signals received via the Rx antenna being monitored by the true time delay circuit.

Operation 1006 represents evaluating whether there is additional delta delay detected. If not, operation 1006 branches to operation 1008 which represents the system recognizing that the path integrity is valid/no potential eavesdropper is present, whereby the uplink and downlink (UL/DL) path links are kept intact and the monitoring continues.

It should be noted that some relatively small delay deviation threshold may be used to allow for some margin of error; for example, weather changes, a brief reflection from a bird, and so on can change the delay/angle of arrival, but not significantly. Note however that a local tile controller can already have current local environmental state data (e.g., rain, humidity, temperature and the like) and thus the threshold/expected angle of arrival can be adjusted based on such current local environmental state data. Indeed, in one implementation, such current local environmental state data can be used as input to a generative adversarial network model that evaluates the path integrity.

If instead at operation 1006 additional delta delay is detected, operation 1006 branches to operation 1010 which represents the system recognizing that the path integrity is invalid/a potential eavesdropper is present, whereby the uplink and downlink (UL/DL) path links are compromised. Operation 1012 represents outputting a notification, (e.g., the measured delay value) to the tile controller/base station and so forth for some type of mitigation, e.g., change polarization, add noise, and so on.

Figure 11:
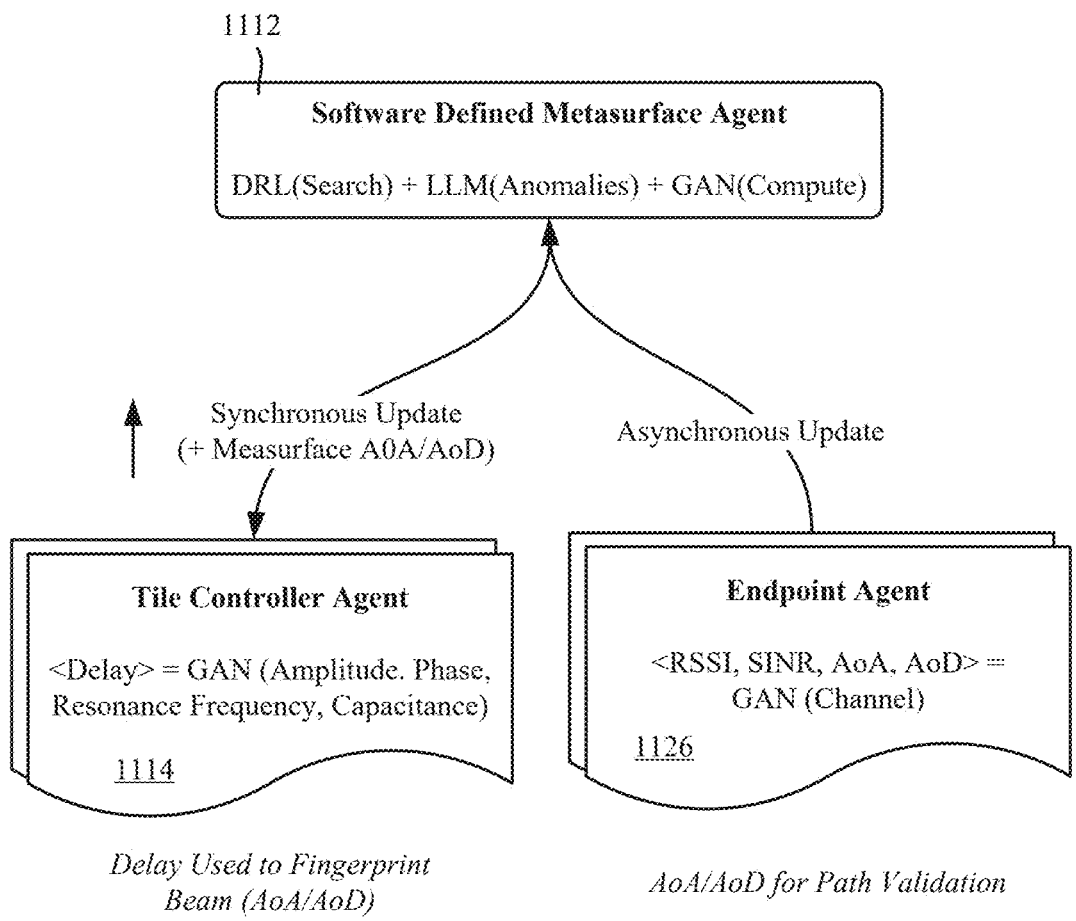
FIG. 11 is a representation of example models within network equipment and a user equipment (endpoint agent) that can be used to detect an invalid communications path, in accordance with various example embodiments and implementations of the subject disclosure.

FIG. 11 shows one example implementation of various AI/ML models for inferencing that can be configured and implemented by the various legitimate entities for use in path integrity validation. In general, the tile controller (an agent 1114) runs a generative adversarial network model having a discriminator trained to fingerprint beam data, and in particular, to compute a delay based on amplitude, phase, resonance frequency and capacitance associated with a monitored signal. These delay data are fed via (e.g., synchronous sampling) updates to a software defined metasurface agent 1112, which is configured with multiple models.

An endpoint agent 1126, e.g., running on the user equipment, also runs a generative adversarial network model based on channel characteristics for signals. Note that a generative adversarial network model is similar to traditional compute methods, but is mapped into very small footprint suitable for user equipment resources. In general, the endpoint agent's generative adversarial network model captures a vector <RSSI, SINR, AoA, AoD> (received signal strength information, signal-plus-interference-to-noise-ratio data, angle of arrival data, angle of departure data) from the channel characteristics and sends the information via asynchronous updates to the software defined metasurface agent 1112.

In general, the software defined metasurface agent 1112 runs in a controller on the edge cloud or the like, and is therefore centralized from the perspective of base stations and/or tile controllers, which can have wired connections to the edge cloud. In one example implementation, the software defined metasurface agent 1112 includes a deep information learning (DRL) model for path searching, although in this system the location of the reconfigurable intelligent surface is known. A large language model (LLM) is used for macro level anomaly detection. A generative adversarial network (GAN) uses the delay data and the user equipment-provided vector data to compute and evaluate the angles of arrival with the expected angles of arrival, notifying the tile controller if an anomaly is detected.

Figure 12:
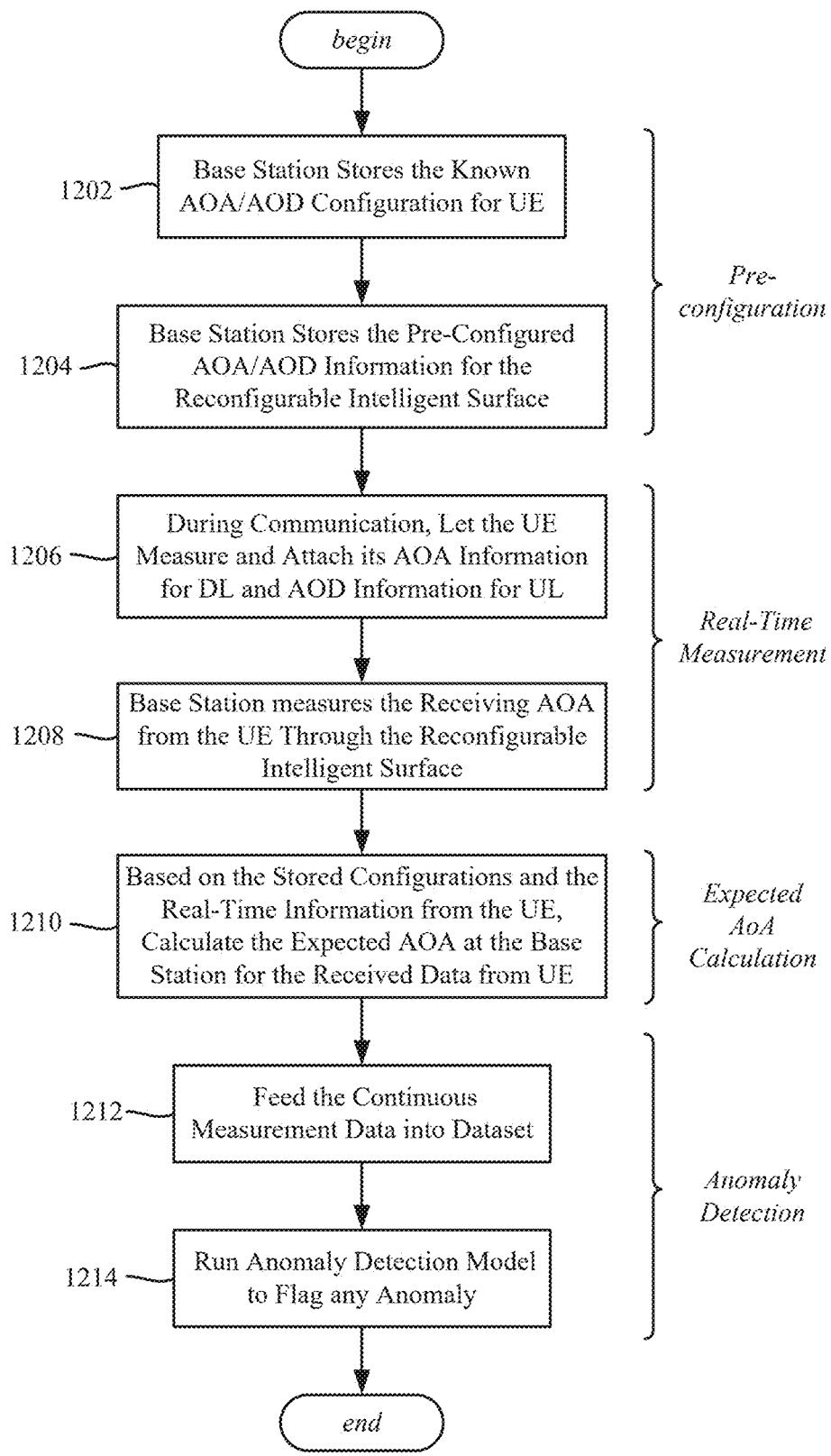
FIG. 12 is a flow diagram showing example operations related to angle of arrival/angle of departure (AoA/AoD) assisted path validation, in accordance with various example embodiments and implementations of the subject disclosure.

FIG. 12 summarizes various operations related to angle of arrival/angle of departure-assisted path validation, beginning with pre-configuration operations 1202 and 1204. Operation 1202 represents the base station storing the known angle of arrival/angle of departure configuration for the user equipment. Operation 1204 represents base station storing the pre-configured angle of arrival/angle of departure information for the reconfigurable intelligent surface.

Operations 1206 and 1208 are directed towards real-time measurement, including operation 1206 which, during communication, lets the user equipment measure and attach its angle of arrival information for downlink signals and angle of departure information for uplink signals. At operation 1208, the base station measures the receiving angle of arrival from the user equipment through the reconfigurable intelligent surface.

Operation 1210 represents the expected angle of arrival determination. More particularly, based on the stored configurations and the real-time information from the user equipment, operation 1210 calculates the expected angle of arrival at the base station for the received data from user equipment.

With respect to anomaly detection, operation 1212 represents feeding the continuous measurement data into a dataset. Based on the dataset, operation 1214 runs the anomaly detection model to flag any anomaly and output a notification if an anomaly is detected.

Figure 13:
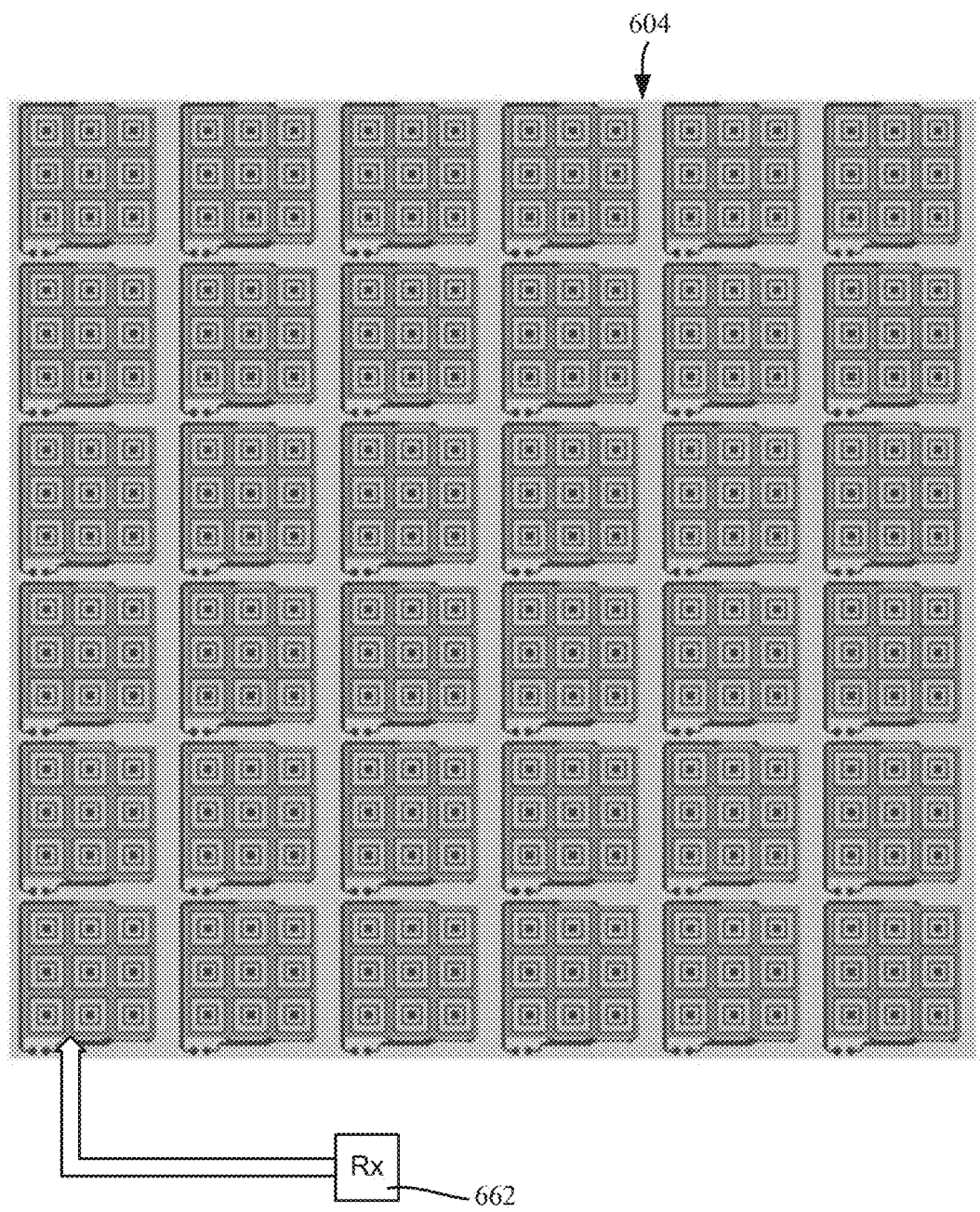
FIG. 13 is a reconfigurable intelligent surface of 6×6 panels using individual 3×3 modules of unit cells (total 18×18 unit-cell elements), coupled to a receive (Rx) antenna, in accordance with various example embodiments and implementations of the subject disclosure.

Turning to detection of an eavesdropper tapping into the signal (e.g., FIG. 3), FIG. 13 shows a reconfigurable intelligent surface 1304 in which the unit cells are arranged as 3×3 subarrays in modules, or subpanels in a 13×13 array, forming a total of 18×18 unit-cell elements. There is no requirement that unit cells be arranged as subarrays, or modules, however certain situations benefit from having such modules, e.g., a selected number of such modules can be interconnected as needed for a given scenario. As set forth herein, at least one receive Rx antenna 1362 is associated with the reconfigurable intelligent surface 1304 and coupled to corresponding reconfigurable delay detection network circuitry.

Figure 14:
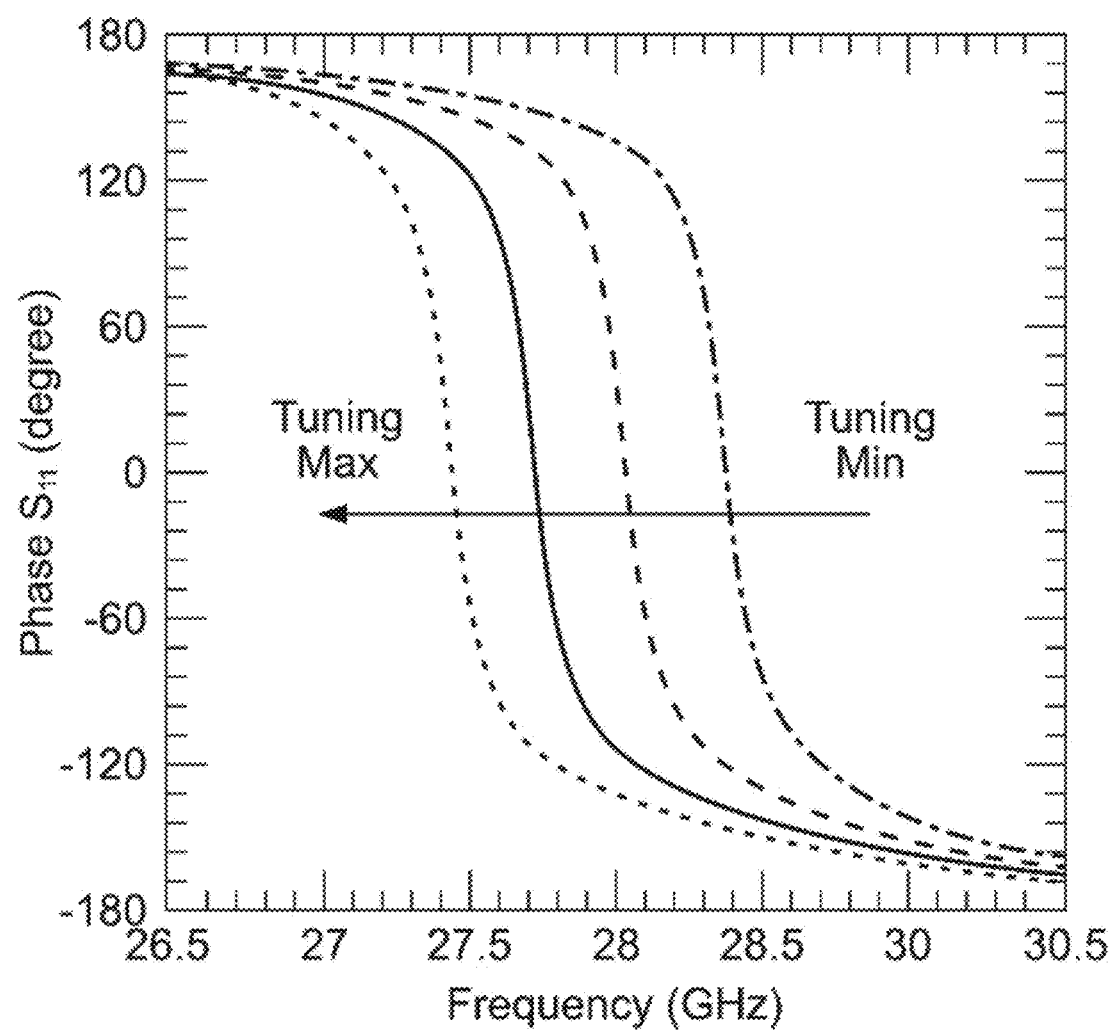
FIG. 14 is a graphical representation of phase of a reflected signal around the operational frequency of 28 GHz, as varied with the change in capacitance of varactor, in accordance with various example embodiments and implementations of the subject disclosure.
Figure 15:
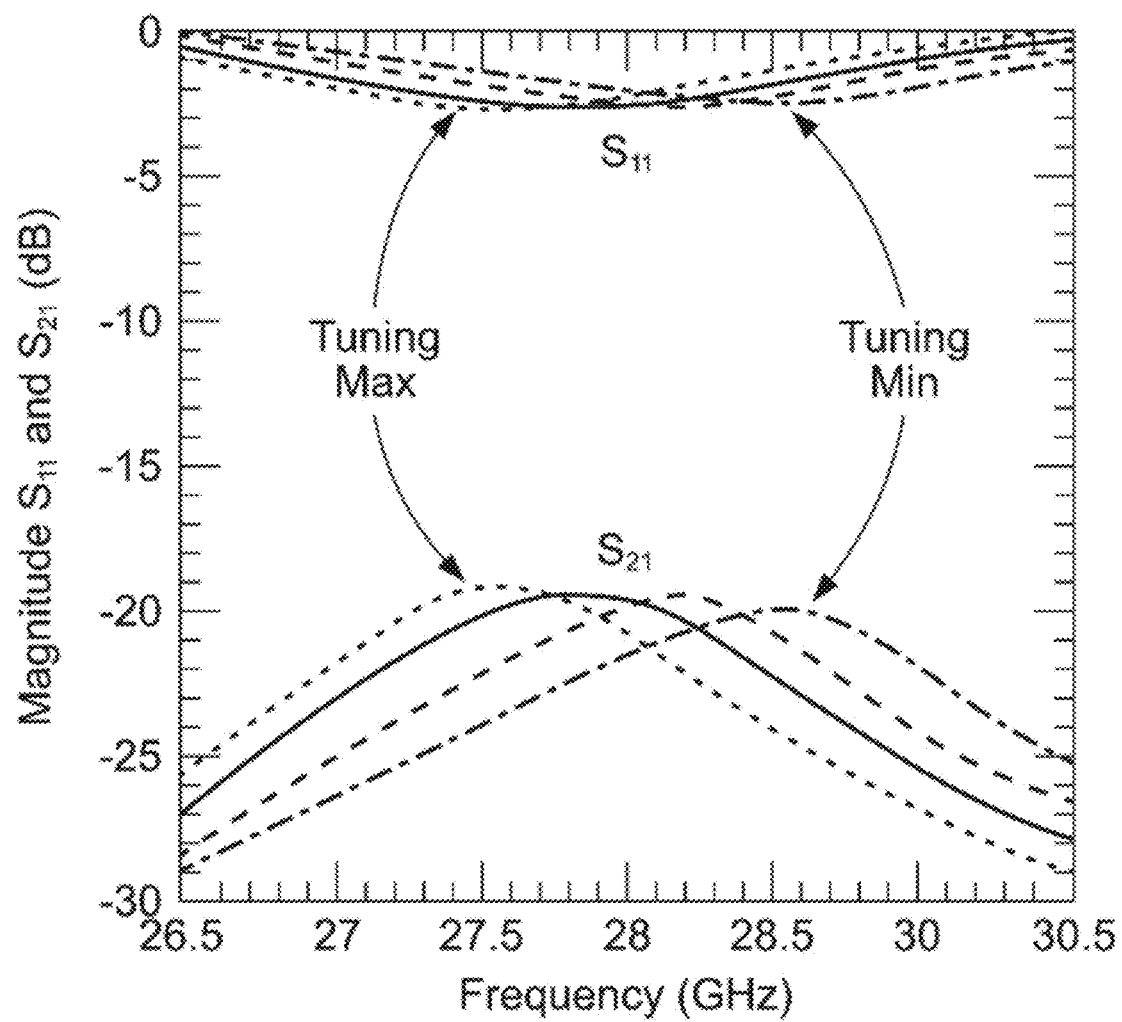
FIG. 15 is a graphical representation of the magnitude of the reflected signal, and the magnitude of the signal coupled to a substrate integrated waveguide, for different varactor capacitances, in accordance with various example embodiments and implementations of the subject disclosure.

FIG. 14 shows the phase of a reflected signal ($S_{11}$) around the operational frequency of 28 GHz, with the change in capacitance of a varactor from a tuning minimum to a tuning maximum based on varying bias voltage. FIG. 15 graphically shows the magnitude of the transmitted signal ($S_{21}$) and the reflected signal ($S_{11}$).

In FIG. 15, the $S_{11}$ magnitude with varying capacitance tuning highlights the reflection from the reconfigurable intelligent surface element, while the $S_{21}$ magnitude indicates the signal's interaction with the receive antenna(s) of the reconfigurable intelligent surface. Significantly, without an eavesdropper the magnitude of the coupled signal $S_{21}$ remains under −19 dB for all capacitance values in the varactor tuning range. Simultaneously, the reflection coefficient's magnitude $S_{11}$ stays above −3 dB. A drop in the magnitudes of the reflected signal and the coupled signal can be indicative of the signal path being compromised by an eavesdropper sniffing part of the signal energy.

Figure 16:
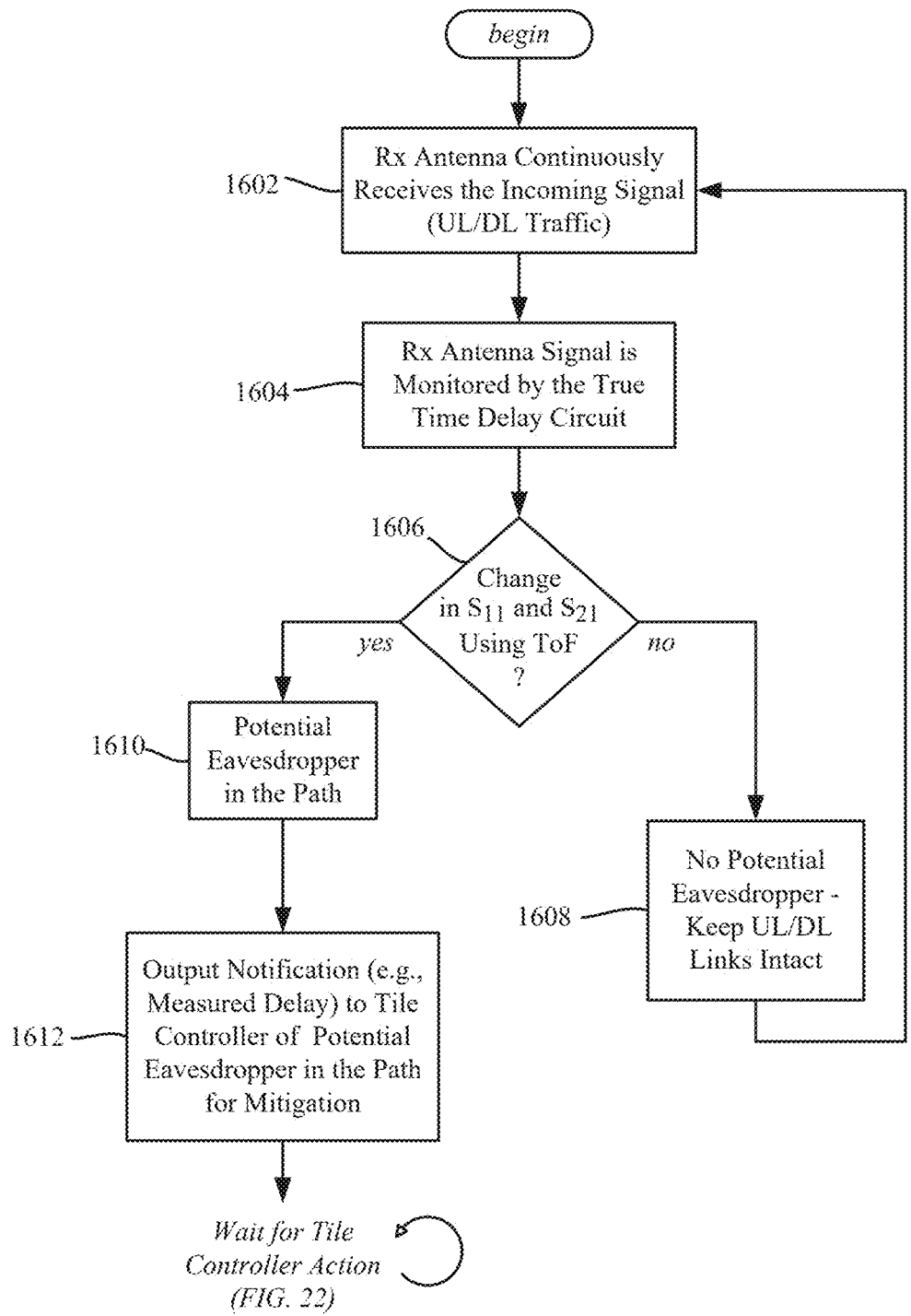
FIG. 16 is a flow diagram showing example operations related to monitoring the receive (Rx) antenna of a reconfigurable intelligent surface to determine if a signal path is compromised by a potential eavesdropper, in accordance with various example embodiments and implementations of the subject disclosure.

FIG. 16 is a flow diagram showing example operations related to determining whether the signal path is compromised, beginning at operation 1602 which represents the Rx antenna continuously receiving the incoming signals for both uplink and downlink (UL/DL) traffic. Operation 1604 represents the incoming signals received via the Rx antenna being monitored by the true time delay circuit.

Operation 1606 represents evaluating whether there is a change in the $S_{11}$ and $S_{21}$ magnitude using time of flight to validate the path integrity/fingerprint the reconfigurable intelligent surface in the path. If no change for a valid path, operation 1606 branches to operation 1608 which represents the system recognizing that the path integrity is valid/not compromised (no potential eavesdropper is present), whereby the uplink and downlink (UL/DL) path links are kept intact and the monitoring continues.

It should be noted that some relatively small signal strength deviation threshold may be used to allow for some margin of error; for example, weather changes, a brief reflection from a bird, and so on can change the signal strength, but this can be factored into the monitoring. Note that a local tile controller can already have current local environmental state data (e.g., rain, humidity, temperature and the like) and thus expected signal strength and/or expected time of flight can be adjusted based on such current local environmental state data. Indeed, in one implementation, such current local environmental state data can be used as input to a generative adversarial network model or other AI/ML model that evaluates the path integrity and signal strength.

If instead at operation 1606 a drop in expected signal strength over an otherwise valid path is detected, operation 1606 branches to operation 1610 which represents the system recognizing that a potential eavesdropper is present, whereby the uplink and downlink (UL/DL) path links are compromised. Operation 1612 represents outputting a notification, (e.g., the measured signal strength change value) to the tile controller/base station and so forth for some type of mitigation, e.g., change polarization, add noise, and so on.

Figure 17:
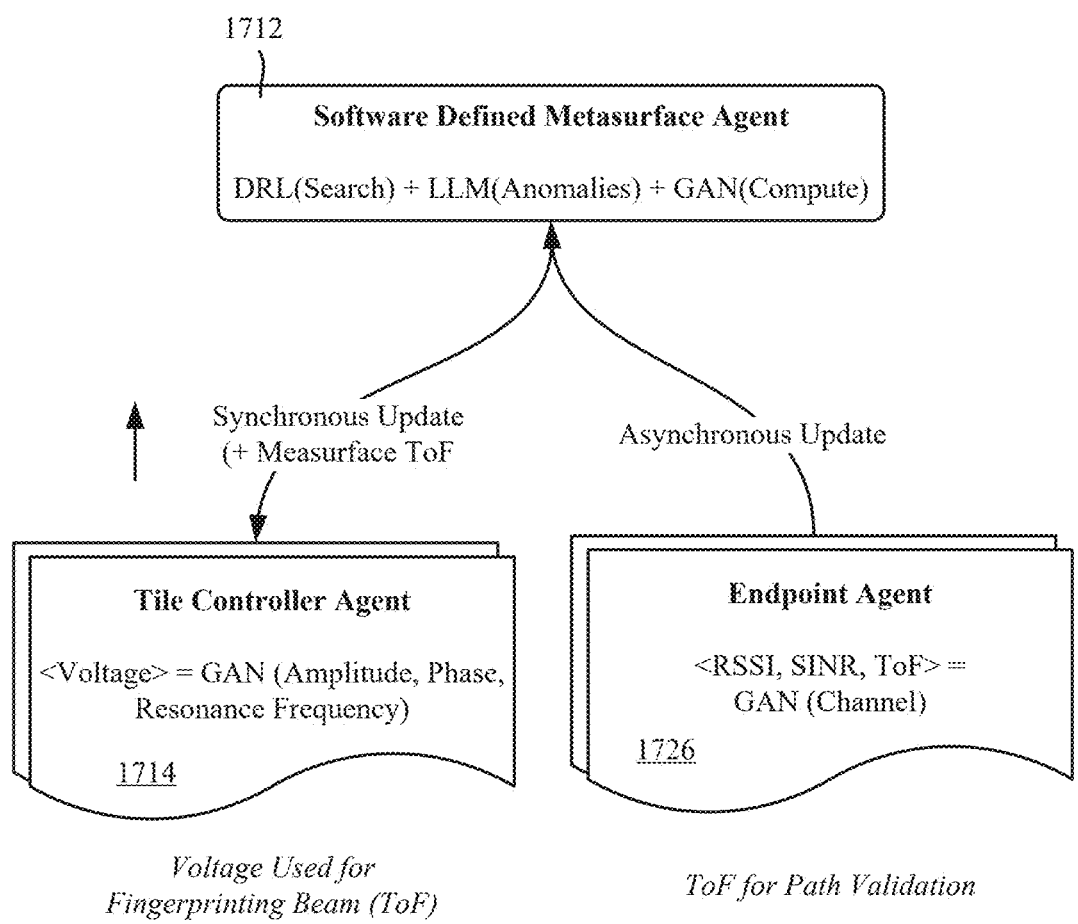
FIG. 17 is a representation of example models within network equipment and a user equipment (endpoint agent) that can be used to detect an invalid communications path indicative of the presence of an eavesdropper, in accordance with various example embodiments and implementations of the subject disclosure.

FIG. 17 shows one example implementation of various AI/ML models for inferencing that can be configured and implemented by the various legitimate entities for use in path integrity validation. In general, the tile controller (an agent 1714) runs a generative adversarial network model having a discriminator trained to fingerprint beam data, and in particular, to compute a voltage value based on amplitude, phase, and resonance frequency. These voltage data are fed via (e.g., synchronous sampling) updates to a software defined metasurface agent 1712, which is configured with multiple models.

An endpoint agent 1726, e.g., running on the user equipment, also runs a generative adversarial network model based on channel characteristics for signals. Note that a generative adversarial network model is similar to traditional compute methods, but is mapped into very small footprint suitable for user equipment resources. In general, the endpoint agent's generative adversarial network model captures a vector <RSSI, SINR, ToF> (received signal strength information, signal-plus-interference-to-noise-ratio data, and time of flight data) from the channel characteristics and sends the information via asynchronous updates to the software defined metasurface agent 1712.

In general, the software defined metasurface agent 1712 runs in a controller on the edge cloud or the like, and is therefore centralized from the perspective of base stations and/or tile controllers, which can have wired connections to the edge cloud. In one example implementation, the software defined metasurface agent 1712 includes a deep information learning (DRL) model for path searching, although in this system the location of the reconfigurable intelligent surface is known. A large language model (LLM) is used for macrolevel anomaly detection. A generative adversarial network (GAN) uses the voltage data and the user equipment-provided vector data to evaluate the path integrity and signal strength data, notifying the tile controller if an anomaly is detected.

Figure 18:
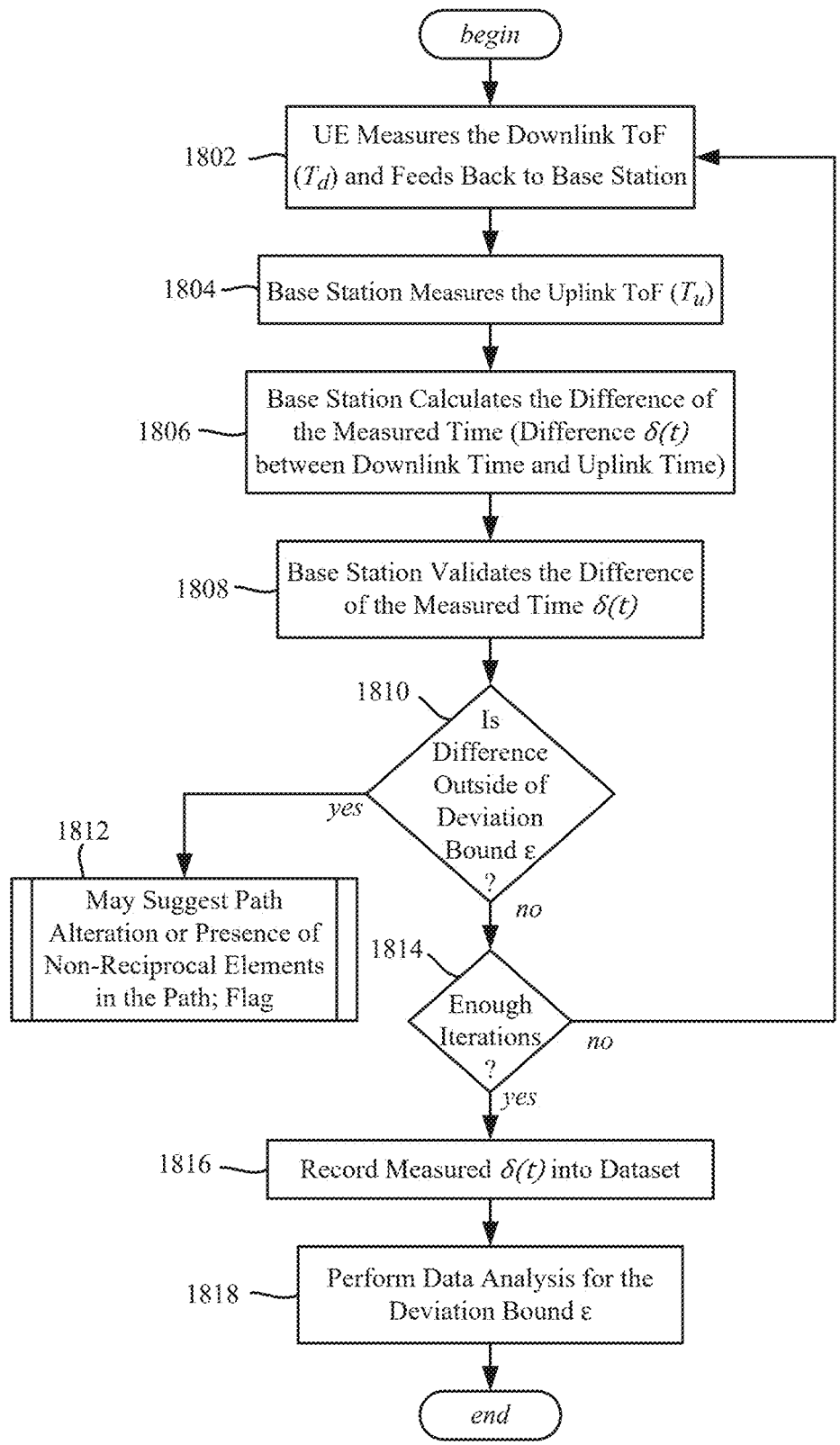
FIG. 18 is a flow diagram showing example operations related to time-of-flight-assisted path validation, in accordance with various example embodiments and implementations of the subject disclosure.

FIG. 18 summarizes various operations related to time-of-flight assisted path validation, beginning at operations 1802 and 1804 which represent obtaining downlink and uplink time measurements, respectively. Operation 1802 represents the UE measuring the downlink time-of-flight (Ta), which is measured by the UE as $T_d=T_{path}+T_{ris_d}+T_{env}$, feeding $T_d$ back to the base station, where $T_{path}$ denotes the time of flight over the path, $T_{ris_d}$ denotes the fixed delay for the downlink reflective element of the reconfigurable intelligent surface (RIS), which is only known by the base station, and $T_{env}$ denotes the environmental injected delay.

Operation 1804 represents the base station measuring the uplink time-of-flight ($T_u$), which is measured by base station as $T_d=T_{path}+T_{ris_d}+T'_{env}$, where $T_{ris_u}$ denotes the fixed delay for the uplink reflected element of the reconfigurable intelligent surface (RIS), which is also only known by the base station. Note that if the uplink is in the same path as the downlink, the environmental-related delay should be reciprocal, $T_{env}=T'_{env}$.

At operation 1806, the base station determines the difference of the measured time. The difference between the downlink time and the uplink time is calculated as:

$$|\delta(t)| = |T_d - T_u| = |T_{ris_d} - T_{ris_u}|.$$

At operation 1808, the base station validates the $\delta(t)$ time difference, because only the base station knows about the reconfigurable intelligent surface's fixed delay values of $T_{ris_d}$ and $T_{ris_u}$, e.g., determined as part of deployment of the reconfigurable intelligent surface. If $|T_d-T_u|=|\delta(t)|+\epsilon$, where $\epsilon$ is a deviation bound, then evaluating this equation indicates that path is reciprocal and valid. Deviation from this equality may suggest path alteration(s) or the presence of one or more non-reciprocal elements in the path, which can be flagged via operations 1810 and 1812.

Operations 1814 and 1816 repeat the previous operations for some number of iterations, with the measured data for the iterations and recorded in a dataset. The expected time of flight data is thus known over the signal path for use in evaluating actual time of flight delays for signal path verification. Operation 1818 performs (e.g., via an ML model) data analysis for the deviation bound $\zeta$.

Figure 19:
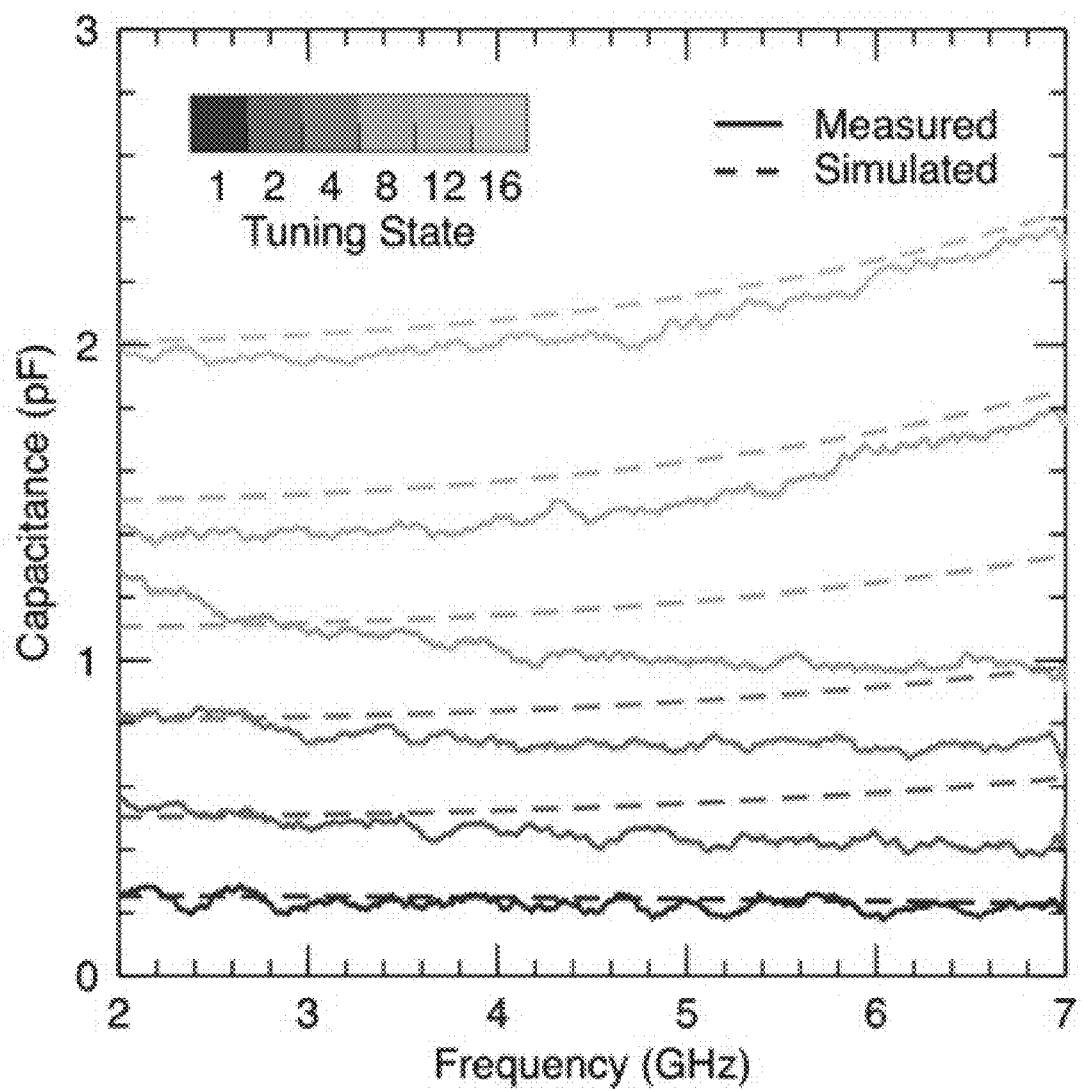
FIG. 19 is a flow diagram showing example operations related to changing a capacitance network to include dynamic delay upon determining that a signal path is compromised by a potential eavesdropper, in accordance with various example embodiments and implementations of the subject disclosure.
Figure 20:
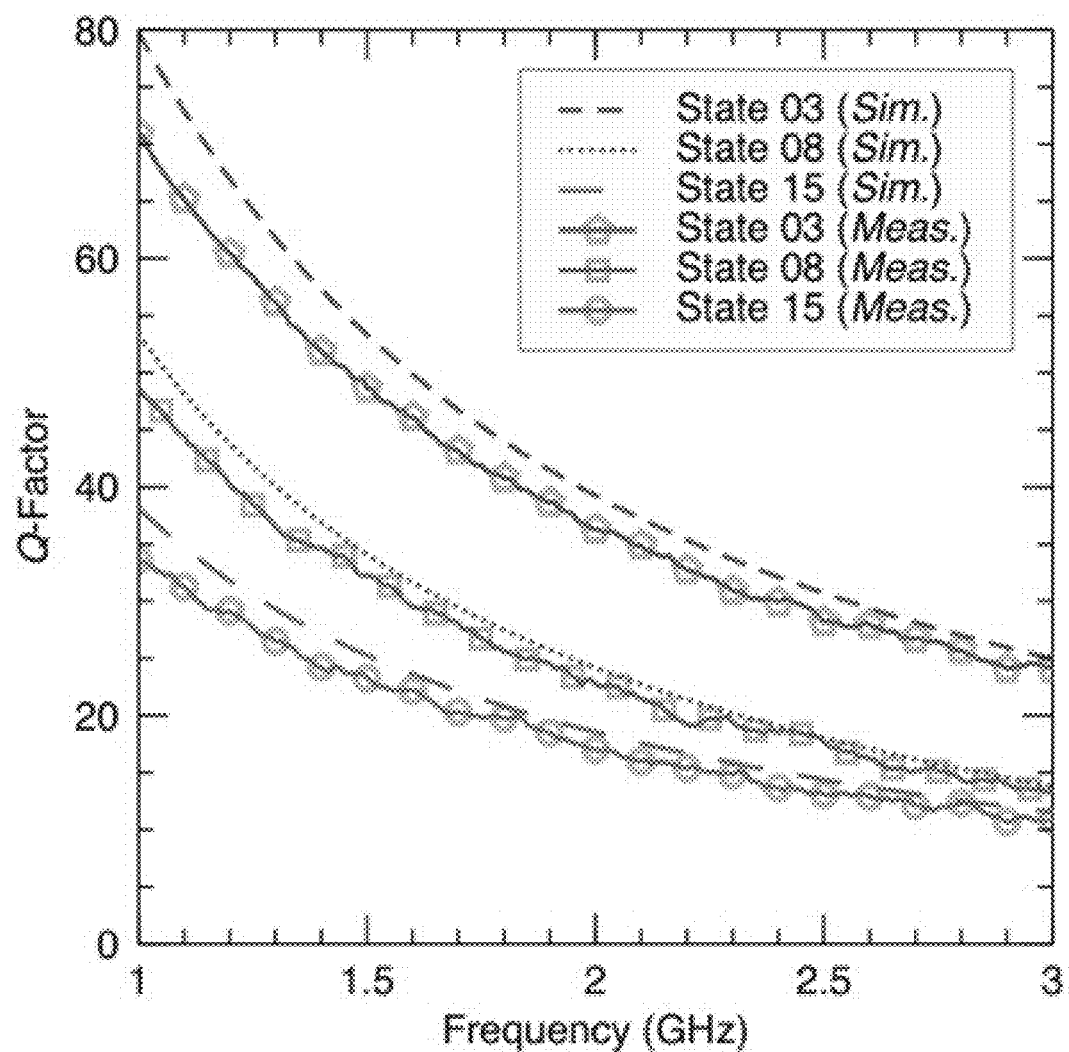
FIG. 20 is a representation of example results highlighting capacitance matching over the low-to-high C-band, in accordance with various example embodiments and implementations of the subject disclosure.
Figure 21:
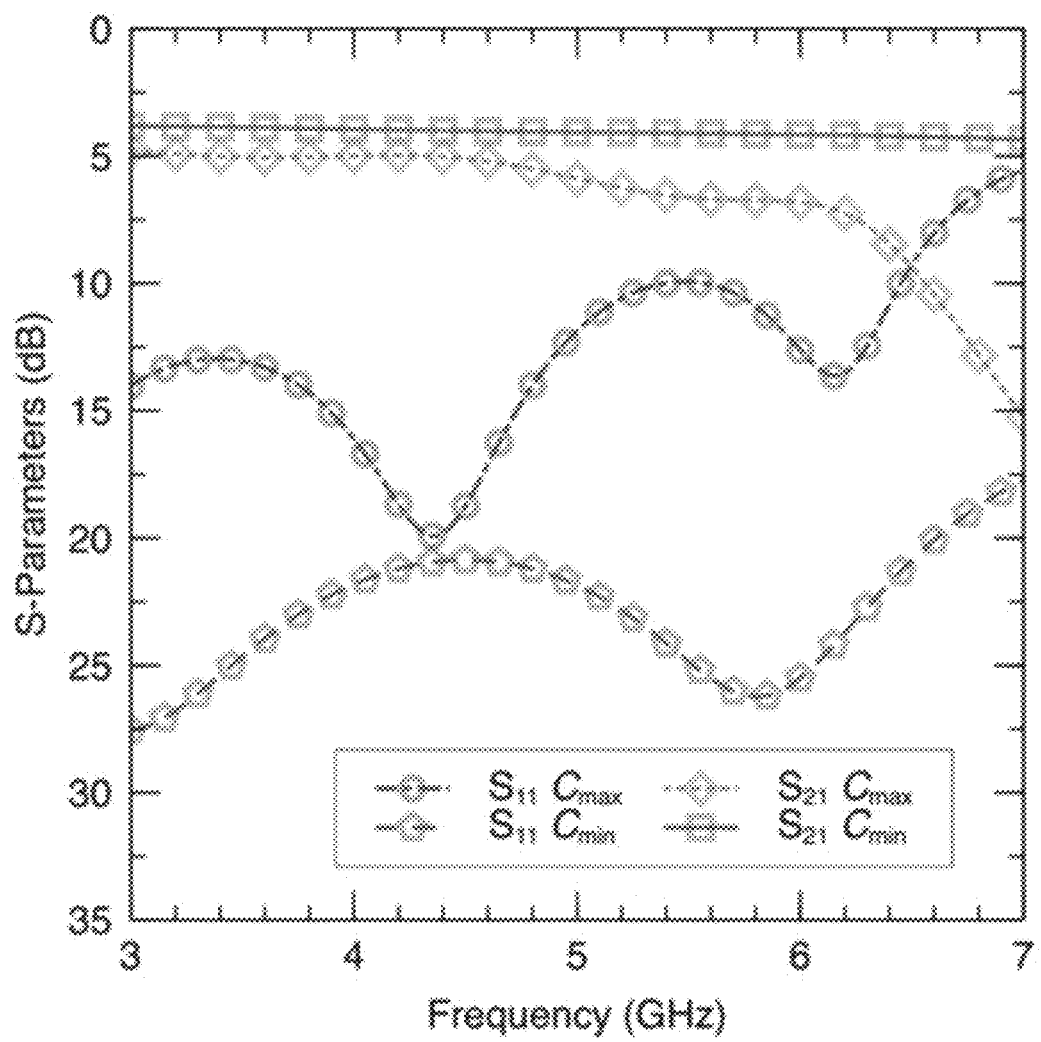
FIG. 21 is a representation of example extracted Q-factor values of various states of capacitors connected in the reconfigurable delay network, in accordance with various example embodiments and implementations of the subject disclosure.

FIG. 19 shows example results highlighting capacitance matching over low to high C-band frequencies, showing measured and simulated capacitance values in picofarads (pF) from 2 to 7 gigahertz (GHz) for different tuning states (obtained through different combinations of switch states, e.g., in FIG. 6). FIG. 20 shows example extracted measured and simulated Q-factor values of various states of the capacitors (obtained through different combinations of switch states, e.g., in FIG. 6) connected in the reconfigurable delay network. FIG. 21 shows example magnitude response values (for the S-parameters $S_{11}$ and $S_{21}$) in dB for minimum $C_{min}$ and maximum $C_{max}$ detection and correction signals over various C-band frequencies, highlighting matched C-band operation.

Figure 22:
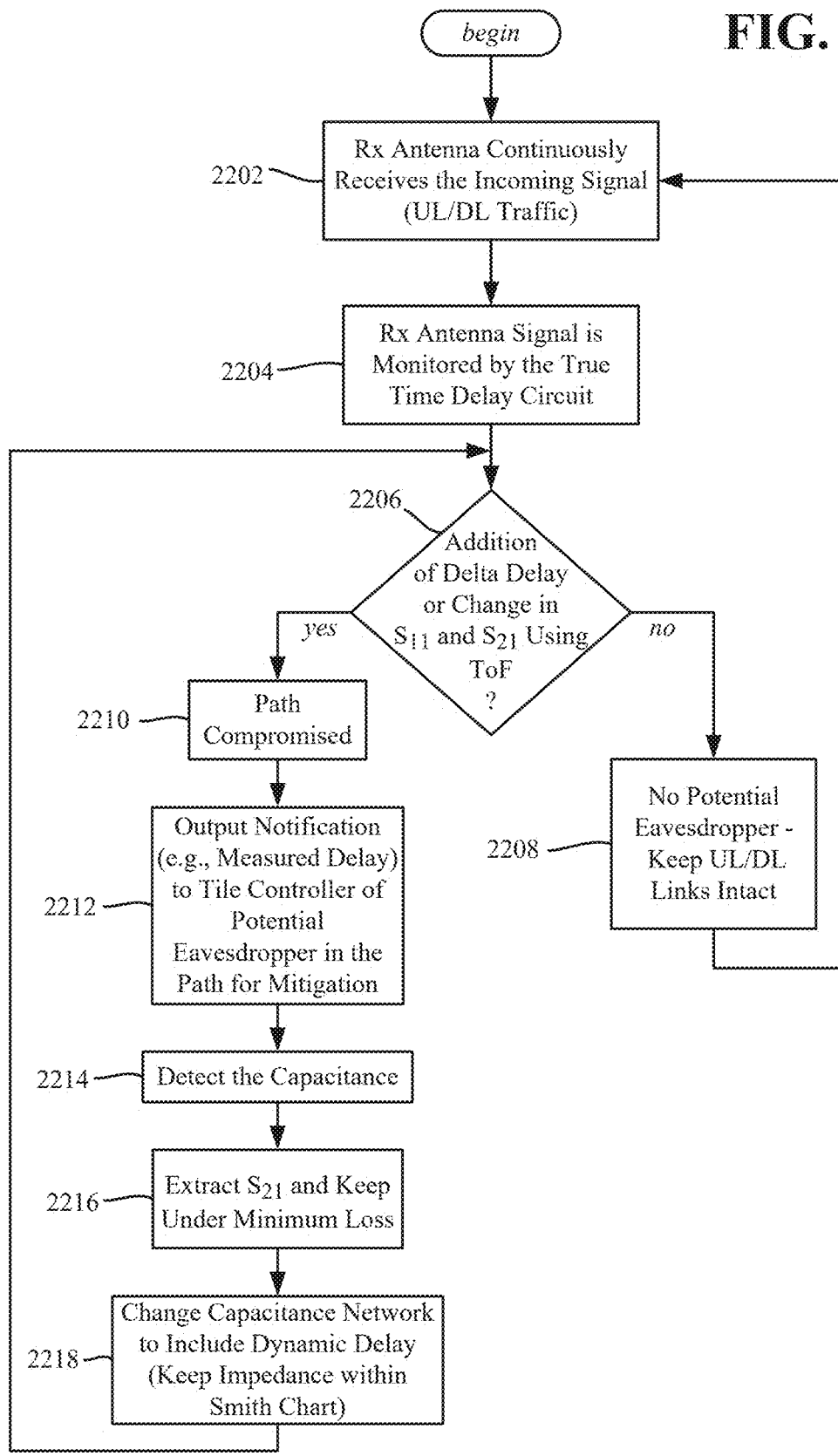
FIG. 22 is a representation of example magnitude response for minimum and maximum detection and correction signals in the C-band, in accordance with various example embodiments and implementations of the subject disclosure.

FIG. 22 is a flow diagram showing example operations related to determining whether the signal path is compromised, beginning at operation 2202 which represents the Rx antenna continuously receiving the incoming signals for both uplink and downlink (UL/DL) traffic. Operation 2204 represents the incoming signals received via the Rx antenna being monitored by the true time delay circuit.

Operation 2206 represents evaluating whether there is additional delta delay detected. Operation 2206 also represents evaluating whether there is a change in the $S_{11}$ and $S_{21}$ magnitudes using time-of-flight data to validate the path integrity/fingerprint the reconfigurable intelligent surface in the path. If no additional delay, or no signal drop for a valid path, operation 2206 branches to operation 2208 which represents the system recognizing that the path integrity is valid/not compromised (no potential eavesdropper is present), whereby the uplink and downlink (UL/DL) path links are kept intact and the monitoring continues.

If instead at operation 2206 there is additional delta delay detected, or there is a drop in expected signal strength over an otherwise valid path is detected, operation 2206 branches to operation 2210 which represents the system recognizing that a potential eavesdropper is present, whereby the uplink and downlink (UL/DL) path links are compromised. Operation 2212 represents outputting a notification, (e.g., the measured signal strength change value) to the tile controller/base station and so forth for some type of mitigation, e.g., change polarization, add noise, and so on.

In the example described herein, the mitigation/correction is achieved by including variable delay times into subsequent communications, e.g., with an intermittent (e.g., random or pseudorandom) delay pattern known to the transmitter (e.g., base station) and receiver (e.g., user equipment), such as determined by the base station and communicated to the user equipment, but unknown to the eavesdropper. Real-time correction is accomplished by operation 2214 detecting the capacitance of the incoming signal, and mapping the capacitance to a state, e.g., corresponding to one of the loading switch combinations. In one implementation, the reconfigurable delay detection network has multiple states to accommodate various wireless signals, e.g., a minimum of 16 states per block, with 8 integrated blocks. Operation 2216 extracts the S21 magnitude for keeping the signal under a minimum loss value.

Operation 2218 changes the capacitance network (e.g., controls the loading switches to select different capacitances over time) to add some varying amount of dynamic delay. Note that this involves making sure the selected capacitance value does not change the impedance outside the Smith chart, (otherwise signal distortion/attenuation results). In sum, this correction remaps the delay by changing the capacitance in the circuit dynamically over time, which still making sure the impedance lands on the Smith chart to not lose the signal (out of bound issues). The remapped signal with dynamic delay is then sent for use; the surface mounted tuning elements (e.g., varactors on top of the unit cells/elements of the reconfigurable intelligent surface can provide element level phase shift to dynamically alter the beam properties; beam direction remains the same but the inherit delay is different, which makes it virtually impossible for the eavesdropper to intercept the UL and DL traffic as attempted in FIG. 2 or 3.

Figure 23:
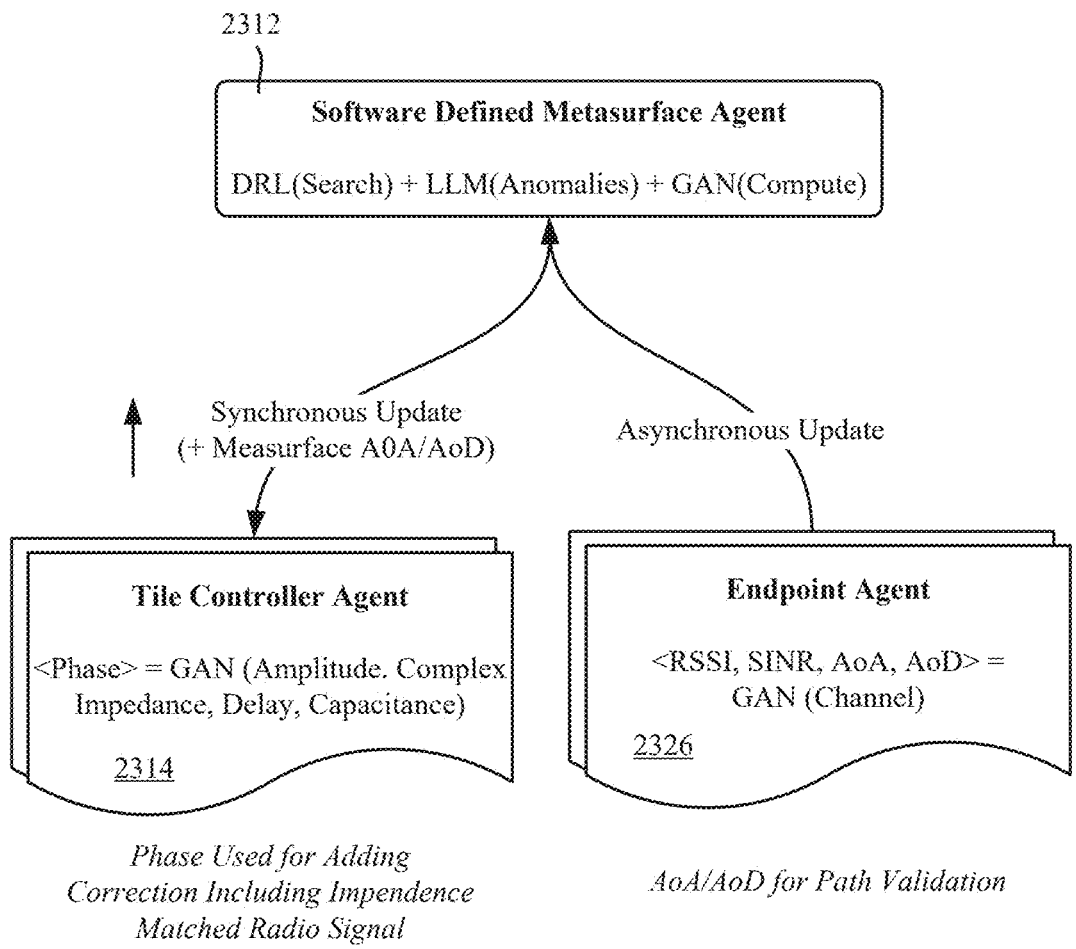
FIG. 23 is a representation of example models within network equipment and a user equipment (endpoint agent) that can be used to add correction to communications over a compromised communications path, in accordance with various example embodiments and implementations of the subject disclosure.

FIG. 23 is a representation of example models within network equipment and a user equipment (endpoint agent) that can be used to add correction to communications over a compromised communications path, in accordance with various example embodiments and implementations of the subject disclosure. By adjusting phase (with matching impedance) to keep radio link performance intact, UL-path eavesdropping is eliminated. Similar models can be used to eliminate downlink path eavesdropping.

In general, the tile controller (an agent 2314) runs a generative adversarial network model having a discriminator trained to compute a phase based on amplitude, complex impedance, delay and capacitance associated with a signal. These phase data are fed via (e.g., synchronous sampling) updates to a software defined metasurface agent 2312, which is configured with multiple models. In this way, the signal delay can be varied, when appropriate due to the communications path being compromised, by the tile controller.

An endpoint agent 2326, e.g., running on the user equipment, also runs a generative adversarial network model based on channel characteristics for signals. Note that a generative adversarial network model is similar to traditional compute methods, but is mapped into very small footprint suitable for user equipment resources. In general, the endpoint agent's generative adversarial network model captures a vector <RSSI, SINR, AoA, AoD> (received signal strength information, signal-plus-interference-to-noise-ratio data, angle of arrival data, angle of departure data) from the channel characteristics and sends the information via asynchronous updates to the software defined metasurface agent 2312.

In general, the software defined metasurface agent 2312 runs in a controller on the edge cloud or the like, and is therefore centralized from the perspective of base stations and/or tile controllers, which can have wired connections to the edge cloud. In one example implementation, the software defined metasurface agent 2312 includes a deep information learning (DRL) model for path searching, although in this system the location of the reconfigurable intelligent surface is known. A large language model (LLM) is used for macro level anomaly detection. A generative adversarial network (GAN) uses the phase data and the user equipment-provided vector data to adjust the phase to correct the signal (e.g., randomly) while keeping radio link performance intact.

Figure 24:
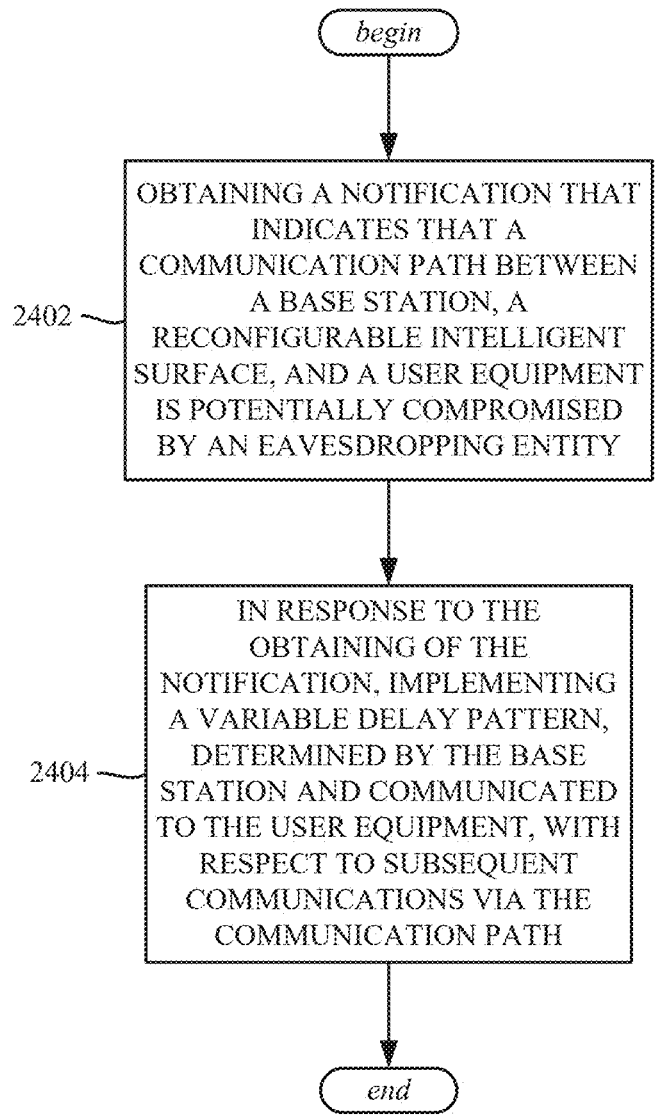
FIG. 24 is a flow diagram showing example operations related to implementing a variable delay pattern with respect to subsequent communications via a communication path between a base station, a reconfigurable intelligent surface and a user equipment, in response to a notification that indicates that the communication path is potentially compromised, in accordance with various example embodiments and implementations of the subject disclosure.

One or more concepts described herein can be embodied in network equipment, such as represented in the example operations of FIG. 24, and for example can include at least one memory that stores computer executable components and/or operations, and at least one processor that executes computer executable components and/or operations stored in the memory. Example operations can include operation 2402, which represents obtaining a notification that indicates that a communication path between a base station, a reconfigurable intelligent surface, and a user equipment is potentially compromised by an eavesdropping entity. Example operation 2404 represents, in response to the obtaining of the notification, implementing a variable delay pattern, determined by the base station and communicated to the user equipment, with respect to subsequent communications via the communication path.

Obtaining the notification can include determining that the communication path is potentially compromised, which can include determining at least one of: a phase change of a signal communicated via the communication path relative to an expected phase, an angle of arrival change of the signal relative to an expected angle of arrival, a capacitance change corresponding to the signal relative to an expected capacitance, or a change in respective delay time data, corresponding to the signal, experienced by respective different unit cells of the reconfigurable intelligent surface, relative to expected delay time data.

Obtaining the notification can include determining that the communication path is potentially compromised, comprising determining at least one of: an amplitude change of a signal communicated via the communication path relative to an expected amplitude, or a time of flight change corresponding to the signal relative to an expected time of flight. Implementing the variable delay pattern can include modifying an impedance of a reconfigurable delay detection network, coupled to a group of unit cells of the reconfigurable intelligent surface, to intermittently change delay times of the subsequent communications via the communication path. Modifying of the impedance can include selecting a modified impedance that satisfies a signal loss threshold.

Obtaining the notification can include determining that the communication path is potentially compromised, which can include determining differential phase change data of a signal communicated via the communication path, experienced by a group of respective different unit cells of the reconfigurable intelligent surface as detected by a reconfigurable delay detection network coupled to the group of respective different unit cell, and determining that an angle of arrival, that maps to the differential phase change data, does not match an expected angle of arrival. Implementing the variable delay pattern can include modifying an impedance of the reconfigurable delay detection network to intermittently change delay times of the subsequent communications via the communication path. Implementing the variable delay pattern further can include controlling switch states to modify capacitance values of the reconfigurable delay detection network to intermittently change delay times of the subsequent communications via the communication path.

The variable delay pattern can include variable delay times corresponding to a random pattern or a pseudorandom pattern.

The network equipment can include a controller coupled to the base station and to the reconfigurable intelligent surface, and a metasurface agent coupled to the controller, and further operations can include obtaining, by the metasurface agent from the controller, respective delay data determined from respective uplink signals communicated to the reconfigurable intelligent surface from the user equipment via the communication path, and obtaining, by the metasurface agent from the user equipment, respective uplink information corresponding to the respective uplink signals; obtaining the notification can include determining that the communication path is potentially compromised, comprising inputting the respective delay data, in conjunction with the respective uplink information, into a generative adversarial network that is executed by the metasurface agent and is trained to detect when a difference value, between an expected angle of arrival and a respective uplink angle of arrival corresponding to a respective delay value of the respective delay data, indicates that the communication path is potentially compromised. The generative adversarial network can be a first generative adversarial network, and further operations can include determining, by the controller, the respective delay data from the respective uplink signals, which can include inputting, for the respective uplink signals, respective amplitude data representative of respective amplitudes of the respective uplink signals, respective phase data representative of respective phases of the respective uplink signals, respective resonance frequency data representative of respective resonance frequencies of the respective uplink signals, and respective capacitance data representative of respective capacitances associated the respective uplink signals, to a second generative adversarial network that is executed by the controller; and obtaining the respective delay data from an output of the second generative adversarial network. The generative adversarial network can be a first generative adversarial network, and obtaining the respective uplink information from the user equipment can include obtaining an output of a second generative adversarial network that is executable via the user equipment based on input data comprising respective received signal strength data representative of respective received signal strengths of the respective uplink signals, respective signal-plus-interference-to-noise-ratio data representative of respective signal-plus-interference-to-noise-ratios of the respective uplink signals, respective downlink angle of arrival data representative of respective downlink angle of arrivals of the respective uplink signals, and respective uplink angle of departure data representative of respective uplink angle of departures of the respective uplink signals.

Figure 25:
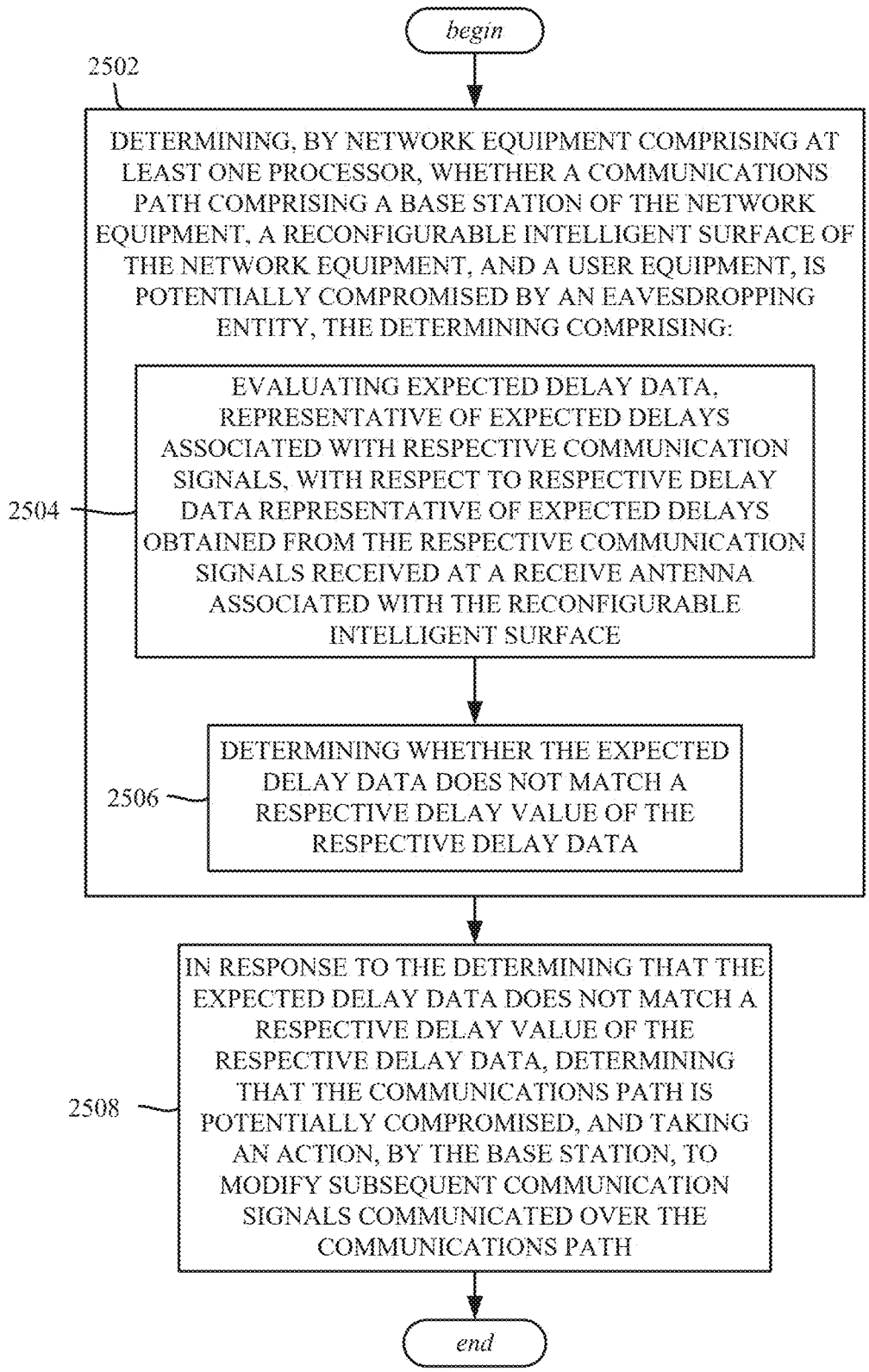
FIG. 25 is a flow diagram showing example operations related to taking an action to modify subsequent communication signals communicated over a communications path in response to determining that the communications path is potentially compromised, in accordance with various example embodiments and implementations of the subject disclosure.

One or more example implementations and embodiments, such as corresponding to example operations of a method, are represented in FIG. 25. Example operation 2502 represents determining, by network equipment comprising at least one processor, whether a communications path comprising a base station of the network equipment, a reconfigurable intelligent surface of the network equipment, and a user equipment, is potentially compromised by an eavesdropping entity, the determining can include example operations 2504 and 2506. Example operation 2504 represents evaluating expected delay data, representative of expected delays associated with respective communication signals, with respect to respective delay data representative of expected delays obtained from the respective communication signals received at a receive antenna associated with the reconfigurable intelligent surface. Example operation 2506 represents determining whether the expected delay data does not match a respective delay value of the respective delay data. Example operation 2508 represents, in response to the determining that the expected delay data does not match a respective delay value of the respective delay data, determining that the communications path is potentially compromised, and taking an action, by the base station, to modify subsequent communication signals communicated over the communications path.

Taking the action can include intermittently modifying respective delay times associated with the subsequent communication signals.

The respective delay data can be detected by delay detection equipment of a delay detection network coupled to a group of unit cells to detect any respective changes in capacitance, and wherein the modifying of the respective delay times can include controlling respective switch states to select among respective available capacitance values of the delay detection equipment of the delay detection network. Further operation can include verifying that a candidate switch state of the available switch states results in a capacitance value that that satisfies a communication signal loss threshold.

Determining whether the communications path is potentially compromised further can include evaluating expected amplitude data, representative of expected amplitudes associated with the respective communication signals, with respect to respective amplitude data representative of respective amplitudes obtained from the respective communication signals, determining whether the expected amplitude data does not match a respective amplitude delay value of the respective amplitude data, and in response to the determining that the expected delay data does not match the respective delay value of the respective delay data, determining that the communications path is potentially compromised, and taking the action, by the base station, to modify the subsequent communication signals communicated over the communications path.

Figure 26:
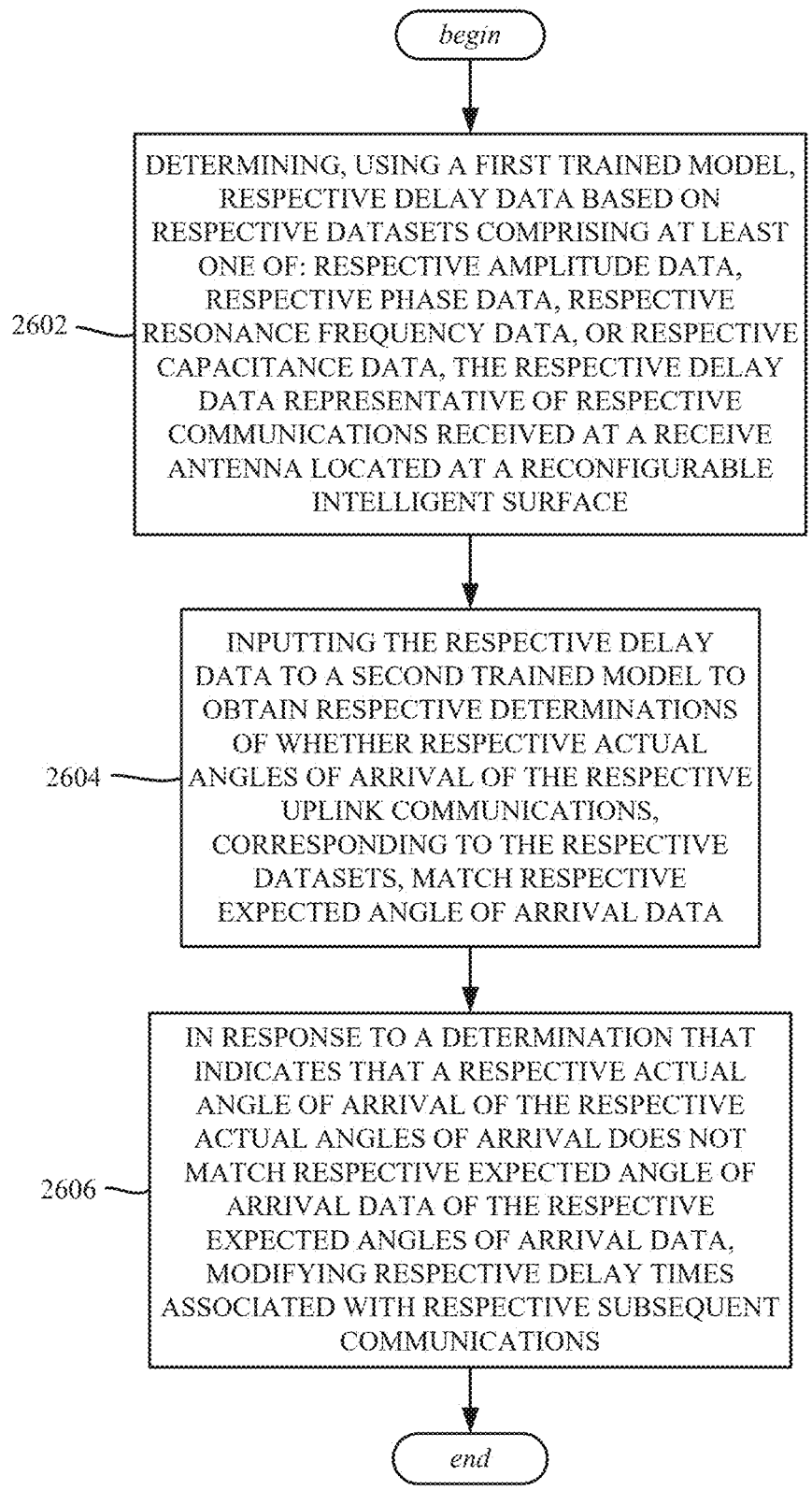
FIG. 26 is a flow diagram showing example operations related to modifying respective delay times associated with respective subsequent communications in response to a determination that indicates that an actual angle does not match an expected angle of arrival, in accordance with various example embodiments and implementations of the subject disclosure.

FIG. 26 summarizes various example operations, e.g., corresponding to a machine-readable medium, comprising executable instructions that, when executed by at least one processor of network equipment, facilitate performance of operations. Example operation 2602 represents determining, using a first trained model, respective delay data based on respective datasets comprising at least one of: respective amplitude data, respective phase data, respective resonance frequency data, or respective capacitance data, the respective delay data representative of respective communications received at a receive antenna located at a reconfigurable intelligent surface. Example operation 2604 represents inputting the respective delay data to a second trained model to obtain respective determinations of whether respective actual angles of arrival of the respective uplink communications, corresponding to the respective datasets, match respective expected angle of arrival data. Example operation

2606 represents, in response to a determination that indicates that a respective actual angle of arrival of the respective actual angles of arrival does not match respective expected angle of arrival data of the respective expected angles of arrival data, modifying respective delay times associated with respective subsequent communications.

Modifying the respective delay times associated with the respective subsequent communications can include changing respective impedance values by controlling respective states of a reconfigurable delay network. The respective impedance values can correspond to respective capacitance values, and controlling the respective states can include controlling respective combinations of switch states to vary the respective capacitance values over time.

As can be seen, the technology described herein is directed to full-path validation and correction (when appropriate), including integrating detection circuitry in reconfigurable intelligent surface hardware such that a full-path validation and correction can be made without any significant compute burden. Integrating full path correction secures the reconfigurable intelligent surface communication links using a hardware-based approach. To this end, integration of a reconfigurable delay network and a tuning element (e.g., varactor) on the reconfigurable intelligent surface's elements dynamically alter the departing signal by adding delay, to mitigate a change of path attack or tapping into the signal path attack by continuously monitoring the path for compromise, and dynamically changing the delay in a compromised path while keeping the loss low and impedance on the Smith Chart. The reconfigurable delay network not only monitors the signal, but also is used to select a different capacitance state, match the impedance and correct the signal. In one implementation, an AI-based approach is used to reduce the computational footprint.

In this way, attackers can be detected when attempting to exploit reconfigurable intelligent surface technology by hijacking and/or altering communication paths, whereby the technology described herein helps to eliminate potential unauthorized access or data interception. Such path manipulation risks emphasize the need for ensuring the integrity of the signal path in reconfigurable intelligent surface-assisted systems.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As used in this application, the terms "component," "system," "platform," "layer," "selector," "interface," and the like are intended to refer to a computer-related resource or an entity related to an operational apparatus with one or more specific functionalities, wherein the entity can be either hardware, a combination of hardware and software, software, or software in execution. As an example, a component can be an apparatus with specific functionality provided by mechanical parts operated by electric or electronic circuitry. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
    at least one processor; and
    at least one memory that stores executable instructions that, when executed by the at least one processor, facilitate performance of operations, the operations comprising:
        obtaining a notification that indicates that a communication path between a base station, a reconfigurable intelligent surface, and a user equipment is potentially compromised by an eavesdropping entity, wherein the network equipment further comprises a controller coupled to the base station and to the reconfigurable intelligent surface, and a metasurface agent coupled to the controller;
        obtaining, by the metasurface agent from the controller, respective delay data determined from respective uplink signals communicated to the reconfigurable intelligent surface from the user equipment via the communication path; and
        obtaining, by the metasurface agent from the user equipment, respective uplink information corresponding to the respective uplink signals, wherein the obtaining of the notification comprises:
            determining that the communication path is potentially compromised, comprising inputting the respective delay data, in conjunction with the respective uplink information, into a generative adversarial network that is executed by the metasurface agent and has been trained to detect when a difference value, between an expected angle of arrival and a respective uplink angle of arrival corresponding to a respective delay value of the respective delay data, indicates that the communication path is potentially compromised; and in response to the obtaining of the notification, implementing a variable delay pattern, determined by the base station and communicated to the user equipment, with respect to subsequent communications via the communication path.

2. The network equipment of claim 1, wherein the obtaining of the notification comprises determining that the communication path is potentially compromised, comprising determining at least one of: a phase change of a signal communicated via the communication path relative to an expected phase, an angle of arrival change of the signal relative to an expected angle of arrival, a capacitance change corresponding to the signal relative to an expected capacitance, or a change in respective delay time data, corresponding to the signal, experienced by respective different unit cells of the reconfigurable intelligent surface, relative to expected delay time data.

3. The network equipment of claim 1, wherein the obtaining of the notification comprises determining that the communication path is potentially compromised, comprising determining at least one of: an amplitude change of a signal communicated via the communication path relative to an expected amplitude, or a time of flight change corresponding to the signal relative to an expected time of flight.

4. The network equipment of claim 3, wherein the implementing of the variable delay pattern comprises modifying an impedance of a reconfigurable delay detection network, coupled to a group of unit cells of the reconfigurable intelligent surface, to intermittently change delay times of the subsequent communications via the communication path.

5. The network equipment of claim 4, wherein the modifying of the impedance comprises selecting a modified impedance that satisfies a signal loss threshold.

6. The network equipment of claim 1, wherein the obtaining of the notification comprises determining that the communication path is potentially compromised, comprising determining differential phase change data of a signal communicated via the communication path, experienced by a group of respective different unit cells of the reconfigurable intelligent surface as detected by a reconfigurable delay detection network coupled to the group of respective different unit cell, and determining that an angle of arrival, that maps to the differential phase change data, does not match an expected angle of arrival.

7. The network equipment of claim 6, wherein the implementing of the variable delay pattern comprises modifying an impedance of the reconfigurable delay detection network to intermittently change delay times of the subsequent communications via the communication path.

8. The network equipment of claim 7, wherein the implementing of the variable delay pattern further comprises controlling switch states to modify capacitance values of the reconfigurable delay detection network to intermittently change delay times of the subsequent communications via the communication path.

9. The network equipment of claim 1, wherein the variable delay pattern comprises variable delay times corresponding to a random pattern or a pseudorandom pattern.

10. The network equipment of claim 1, wherein the generative adversarial network is a first generative adversarial network, and wherein the operations further comprise:

determining, by the controller, the respective delay data from the respective uplink signals, comprising inputting, for the respective uplink signals, respective amplitude data representative of respective amplitudes of the respective uplink signals, respective phase data representative of respective phases of the respective uplink signals, respective resonance frequency data representative of respective resonance frequencies of the respective uplink signals, and respective capacitance data representative of respective capacitances associated the respective uplink signals, to a second generative adversarial network that is executed by the controller; and obtaining the respective delay data from an output of the second generative adversarial network.

11. The network equipment of claim 1, wherein the generative adversarial network is a first generative adversarial network, and wherein the obtaining of the respective uplink information from the user equipment comprises obtaining an output of a second generative adversarial network that is executable via the user equipment based on input data comprising respective received signal strength data representative of respective received signal strengths of the respective uplink signals, respective signal-plus-interference-to-noise-ratio data representative of respective signal-plus-interference-to-noise-ratios of the respective uplink signals, respective downlink angle of arrival data representative of respective downlink angle of arrivals of the respective uplink signals, and respective uplink angle of departure data representative of respective uplink angle of departures of the respective uplink signals.

12. The network equipment of claim 1, wherein the implementing the variable delay pattern comprises intermittently modifying respective delay times associated with the subsequent communications via the communication path.

13. A method, comprising determining, by network equipment comprising at least one processor, whether a communications path comprising a base station of the network equipment, a reconfigurable intelligent surface of the network equipment, and a user equipment, is potentially compromised by an eavesdropping entity, the determining comprising:

evaluating expected delay data, representative of expected delays associated with respective communication signals, with respect to respective delay data representative of expected delays obtained from the respective communication signals received at a receive antenna associated with the reconfigurable intelligent surface, determining whether the expected delay data does not match a respective delay value of the respective delay data, evaluating expected amplitude data, representative of expected amplitudes associated with the respective communication signals, with respect to respective amplitude data representative of respective amplitudes obtained from the respective communication signals, and determining whether the expected amplitude data does not match a respective amplitude delay value of the respective amplitude data; and in response to determining that the expected amplitude data does not match the respective amplitude delay value of the respective amplitude data and in response to the determining that the expected delay data does not match the respective delay value of the respective delay data, determining that the communications path is potentially compromised, and taking an action, by the base station, to modify subsequent communication signals communicated over the communications path.

14. The method of claim 13, wherein the taking of the action comprises intermittently modifying respective delay times associated with the subsequent communication signals.

15. The method of claim 14, wherein the respective delay data is detected by delay detection equipment of a delay detection network coupled to a group of unit cells to detect any respective changes in capacitance, and wherein the modifying of the respective delay times comprises controlling respective switch states to select among respective available capacitance values of the delay detection equipment of the delay detection network.

16. The method of claim 15, further comprising verifying that a candidate switch state of available switch states results in a capacitance value that that satisfies a communication signal loss threshold.

17. A non-transitory machine-readable medium, comprising executable instructions that, when executed by at least one processor of network equipment, facilitate performance of operations, the operations comprising:
   determining, using a first trained model, respective delay data based on respective datasets comprising at least one of: respective amplitude data, respective phase data, respective resonance frequency data, or respective capacitance data, the respective delay data representative of respective communications received at a receive antenna located at a reconfigurable intelligent surface;
   inputting the respective delay data to a second trained model to obtain respective determinations of whether respective actual angles of arrival of the respective uplink communications, corresponding to the respective datasets, match respective expected angle of arrival data;
   evaluating expected amplitude data, representative of expected amplitudes associated with the respective communication signals, with respect to respective amplitude data representative of respective amplitudes obtained from the respective communications;
   determining whether the expected amplitude data does not match a respective amplitude delay value of the respective amplitude data; and
   in response to the determining that the expected amplitude data does not match the respective amplitude value of the respective amplitude data and in response to a determination that indicates that a respective actual angle of arrival of the respective actual angles of arrival does not match respective expected angle of arrival data of the respective expected angles of arrival data, modifying the respective amplitudes and respective delay times associated with respective subsequent communications.

18. The non-transitory machine-readable medium of claim 17, wherein the modifying of the respective delay times associated with the respective subsequent communications comprises changing respective impedance values by controlling respective states of a reconfigurable delay network.

19. The non-transitory machine-readable medium of claim 18, wherein the respective impedance values correspond to respective capacitance values, and wherein the controlling of the respective states comprises controlling respective combinations of switch states to vary the respective capacitance values over time.

20. The non-transitory machine-readable medium of claim 17, wherein the modifying of the respective delay times associated with the respective subsequent communications comprises intermittently modifying respective delay times associated with the subsequent communications.

\* \* \* \* \*